United States Patent
Flynn

(10) Patent No.: US 9,408,035 B2
(45) Date of Patent: Aug. 2, 2016

(54) MOBILE COMPUTING SYSTEM WITH USER PREFERRED INTERACTIVE COMPONENTS

(71) Applicant: Michael Flynn, Newtown, PA (US)

(72) Inventor: Michael Flynn, Newtown, PA (US)

( * ) Notice: Subject to any disclaimer, the term of this patent is extended or adjusted under 35 U.S.C. 154(b) by 0 days.

(21) Appl. No.: 14/701,509

(22) Filed: Apr. 30, 2015

(65) Prior Publication Data

US 2015/0341752 A1    Nov. 26, 2015

Related U.S. Application Data

(60) Provisional application No. 61/986,175, filed on Apr. 30, 2014, provisional application No. 62/017,517, filed on Jun. 26, 2014.

(51) Int. Cl.
| | |
|---|---|
| *H04W 24/00* | (2009.01) |
| *H04W 4/02* | (2009.01) |
| *G06F 3/0481* | (2013.01) |
| *G06F 3/0484* | (2013.01) |
| *G06F 3/0488* | (2013.01) |
| *G06F 17/30* | (2006.01) |

(52) U.S. Cl.
CPC .............. *H04W 4/025* (2013.01); *G06F 3/0488* (2013.01); *G06F 3/04817* (2013.01); *G06F 3/04842* (2013.01); *G06F 17/30864* (2013.01)

(58) Field of Classification Search
CPC .......................... G06Q 30/0267; H04W 4/02
USPC ............... 455/556.1, 556.2, 420, 414.1, 41.2, 455/457; 370/252; 705/14.23, 7.29, 37, 705/14.66, 26.3
See application file for complete search history.

(56) References Cited

U.S. PATENT DOCUMENTS

| | | | |
|---|---|---|---|
| 5,748,927 | A | 5/1998 | Stein et al. |
| 5,870,093 | A | 2/1999 | Martin et al. |
| 6,239,798 | B1 | 5/2001 | Ludolph et al. |
| 6,332,127 | B1 | 12/2001 | Bandera et al. |
| 6,505,046 | B1 | 1/2003 | Baker |

(Continued)

FOREIGN PATENT DOCUMENTS

| | | |
|---|---|---|
| CN | 202133989 U | 2/2012 |
| CN | 102620738 | 8/2012 |

(Continued)

OTHER PUBLICATIONS

Gervasio; http://www.devarticles.com/c/a/JavaScript/Creating-a-Dynamic-Banner-System-with-AJAX/; "Creating a Dynamic Banner System with AJAX"; Jul. 30, 2007.

(Continued)

*Primary Examiner* — Kiet Doan

(57) ABSTRACT

A method and associated device is provided for providing context based information to a user. The device is a mobile device and information is provided on a display to a user. The mobile device enabled to receive input and in processing communication with one or more computers and comprising the steps of storing a user profile having at least information about a plurality of stores; creating a plurality of icons such that each icon at least includes one store; determining if more than one store should be represented under same icons; dynamically updating information about each store represented by said icons to see if a special condition can be associated with any of the stores represented by the icons; and displaying said plurality of icons on a display of the mobile device and adding a special effect to any icon that includes a store identified as having a special condition.

11 Claims, 29 Drawing Sheets

(56) References Cited

U.S. PATENT DOCUMENTS

| | | |
|---|---|---|
| 6,522,342 B1 | 2/2003 | Gagnon et al. |
| 6,892,181 B1 | 5/2005 | Megiddo et al. |
| 6,928,615 B1 | 8/2005 | Haitsuka et al. |
| 7,305,452 B2 | 12/2007 | Sakatani |
| 7,496,943 B1 | 2/2009 | Goldberg et al. |
| 7,516,417 B2 | 4/2009 | Amador et al. |
| 7,559,034 B1 | 7/2009 | Paperny et al. |
| 7,685,537 B2 | 3/2010 | Hoyle |
| 7,765,568 B1 | 7/2010 | Gagnon et al. |
| 7,788,597 B1 | 8/2010 | Mazhar et al. |
| 7,827,062 B2 | 11/2010 | Merriman |
| 8,005,713 B1 | 8/2011 | Sanz-Pastor et al. |
| 8,065,702 B2 | 11/2011 | Goldberg et al. |
| 8,086,559 B2 | 12/2011 | Anderson et al. |
| 8,090,087 B2 | 1/2012 | Jobs et al. |
| 8,225,225 B2 | 7/2012 | Jetha et al. |
| 8,229,780 B2 | 7/2012 | Davidow et al. |
| 8,249,908 B2 | 8/2012 | Kniaz et al. |
| 8,321,790 B2 | 11/2012 | Sherrill et al. |
| 8,352,465 B1 | 1/2013 | Jing et al. |
| 8,352,499 B2 | 1/2013 | Bharat et al. |
| 8,380,175 B2 | 2/2013 | Rao |
| 8,402,372 B2 | 3/2013 | Gillespie et al. |
| 8,499,256 B1 | 7/2013 | Iten et al. |
| 8,554,611 B2 | 10/2013 | Roberts et al. |
| 8,620,740 B2 | 12/2013 | Bergh et al. |
| 8,620,749 B2 | 12/2013 | Rothman et al. |
| 8,983,299 B2 | 3/2015 | Lee et al. |
| 9,058,604 B2 | 6/2015 | Carr et al. |
| 2002/0103698 A1 | 8/2002 | Cantrell |
| 2003/0007006 A1 | 1/2003 | Baar et al. |
| 2005/0091111 A1 | 4/2005 | Green et al. |
| 2005/0257169 A1 | 11/2005 | Tu |
| 2006/0179032 A1 | 8/2006 | Gottsman et al. |
| 2007/0083440 A1 | 4/2007 | Wirtz et al. |
| 2008/0059308 A1 | 3/2008 | Gerken |
| 2008/0109551 A1* | 5/2008 | Sim ................ H04W 48/18 709/228 |
| 2008/0167078 A1 | 7/2008 | Eibye |
| 2008/0168395 A1 | 7/2008 | Ording et al. |
| 2008/0208761 A1 | 8/2008 | Autry et al. |
| 2009/0061901 A1 | 3/2009 | Arrasvuori et al. |
| 2009/0150807 A1 | 6/2009 | George et al. |
| 2009/0172532 A1 | 7/2009 | Chaudhri |
| 2010/0086107 A1 | 4/2010 | Tzruya |
| 2010/0100849 A1 | 4/2010 | Fram |
| 2010/0262449 A1 | 10/2010 | Monteforte |
| 2011/0012921 A1 | 1/2011 | Cholewin et al. |
| 2011/0071895 A1 | 3/2011 | Masri |
| 2011/0082752 A1 | 4/2011 | Dube |
| 2011/0213655 A1 | 9/2011 | Henkin et al. |
| 2011/0238474 A1 | 9/2011 | Carr et al. |
| 2011/0238476 A1 | 9/2011 | Carr et al. |
| 2012/0084689 A1 | 4/2012 | Ledet et al. |
| 2012/0123904 A1 | 5/2012 | Foerster |
| 2012/0131488 A1 | 5/2012 | Karlsson et al. |
| 2012/0150667 A1 | 6/2012 | Salari |
| 2012/0210268 A1 | 8/2012 | Hilbrink et al. |
| 2012/0278172 A1 | 11/2012 | Mercuri et al. |
| 2012/0310750 A1 | 12/2012 | Schutzbank et al. |
| 2012/0323681 A1 | 12/2012 | Bercaw |
| 2013/0111342 A1 | 5/2013 | Alameh et al. |
| 2013/0268353 A1 | 10/2013 | Zeto et al. |
| 2013/0339345 A1* | 12/2013 | Soto Matamala ... G06F 17/3087 707/722 |
| 2014/0006129 A1* | 1/2014 | Heath ................ G06Q 30/0222 705/14.23 |
| 2014/0214663 A1 | 7/2014 | Wolfe |

FOREIGN PATENT DOCUMENTS

| | | |
|---|---|---|
| EP | 1345387 A2 | 9/2003 |
| EP | 1415245 B1 | 2/2011 |
| JP | 2004126637 A | 4/2004 |
| JP | 4366592 | 7/2004 |
| JP | 2007274381 A | 10/2007 |
| JP | 4841596 | 10/2011 |
| JP | 2013047967 A | 3/2013 |
| KR | 20000037274 | 7/2000 |
| WO | 0103374 | 6/2000 |
| WO | 0129727 | 4/2001 |
| WO | 2008086075 A2 | 7/2008 |
| WO | 2013133894 A1 | 9/2013 |
| WO | 2014011139 A1 | 1/2014 |
| WO | 2014073820 A1 | 5/2014 |

OTHER PUBLICATIONS http://www.banmanpro.com/support2/onlinepurchase.asp; "How does the Online Purchasing Option Function?".
"What is Curated Commerce"; Vangie Beal; Webopedia.
"Places API"; CityGrid V2; Sep. 29, 2014.
"Offers API"; CityGrid V2; Apr. 15, 2014.
TripIt—Travel Itinerary; Concur; 2015.

* cited by examiner

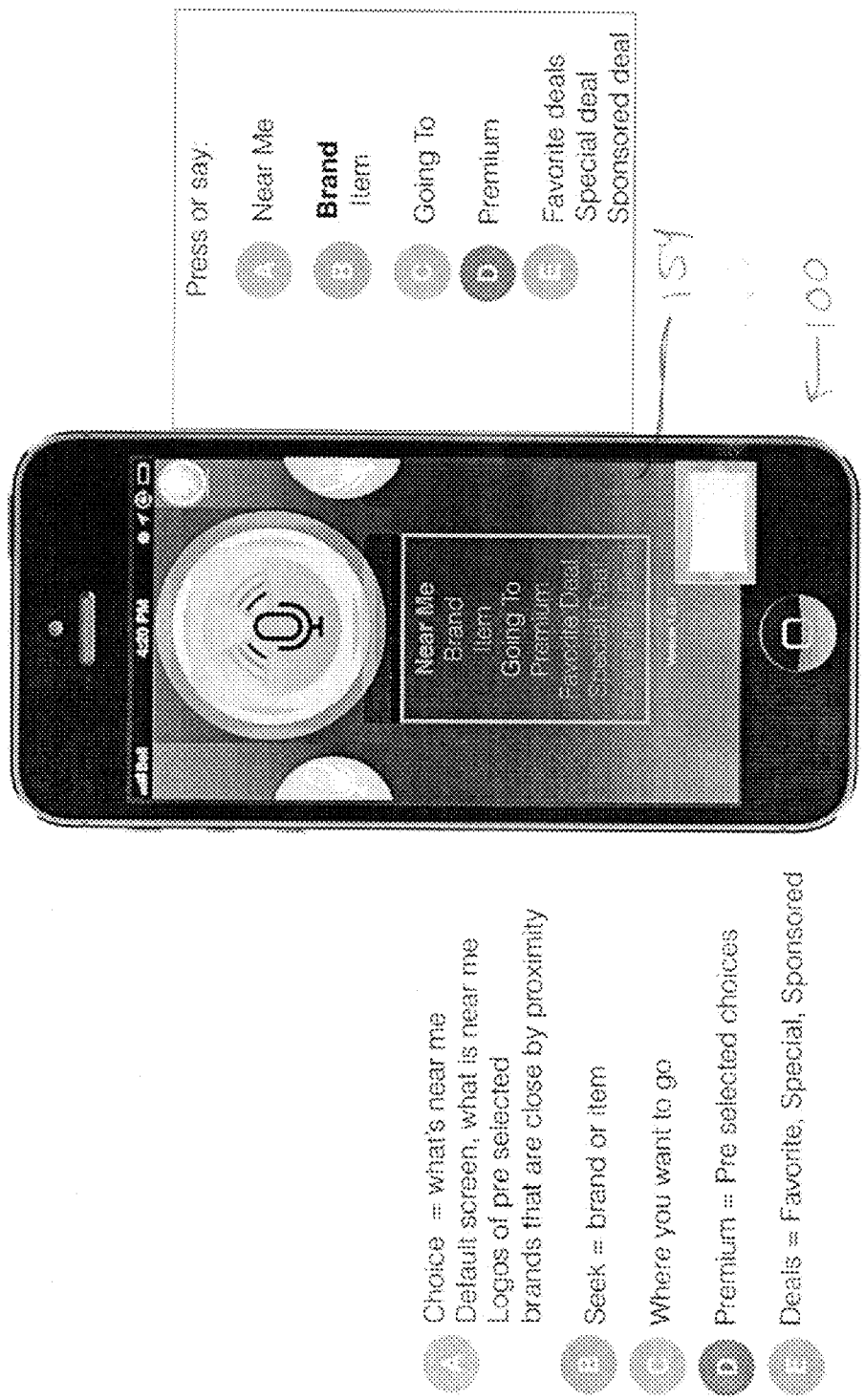

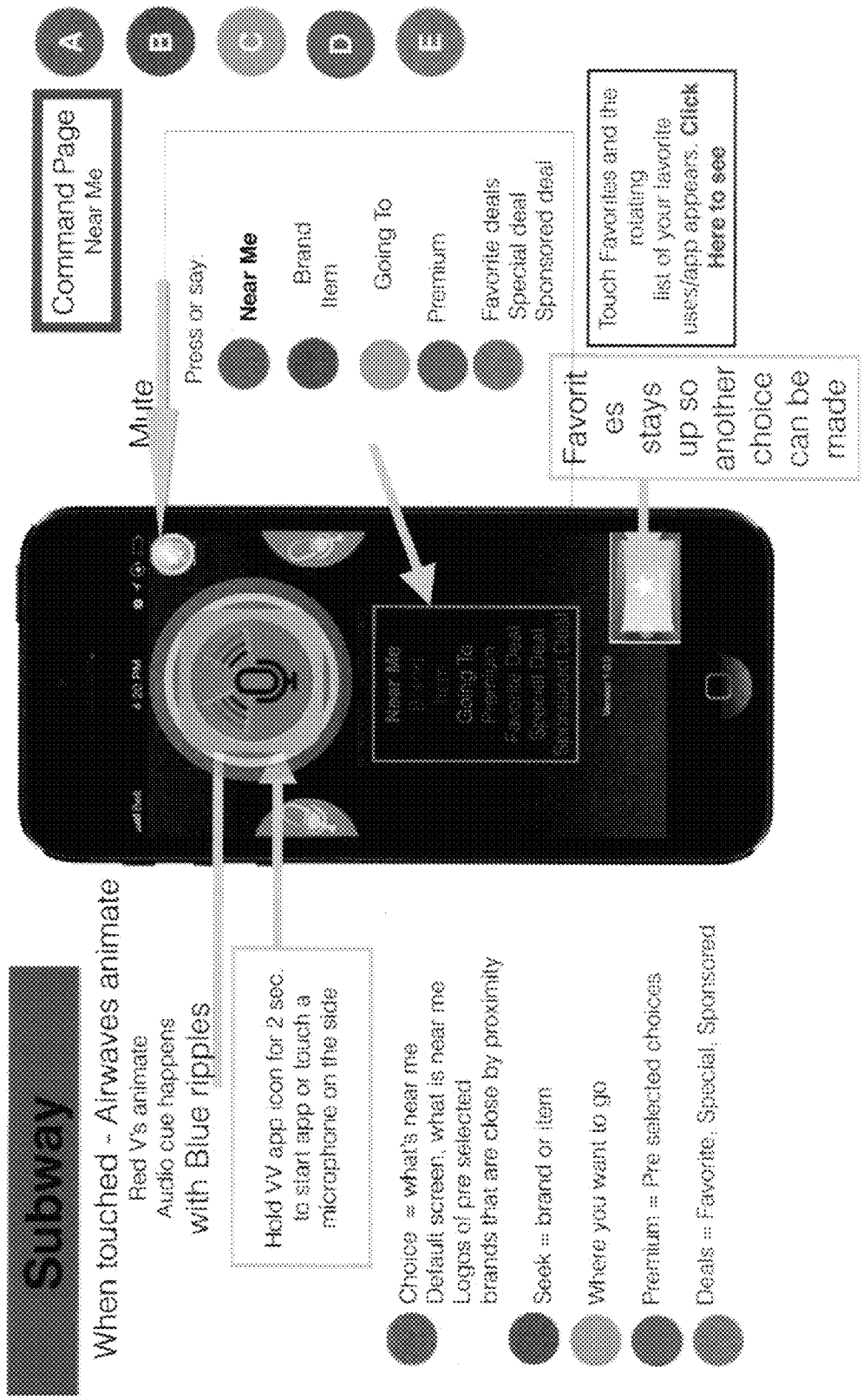

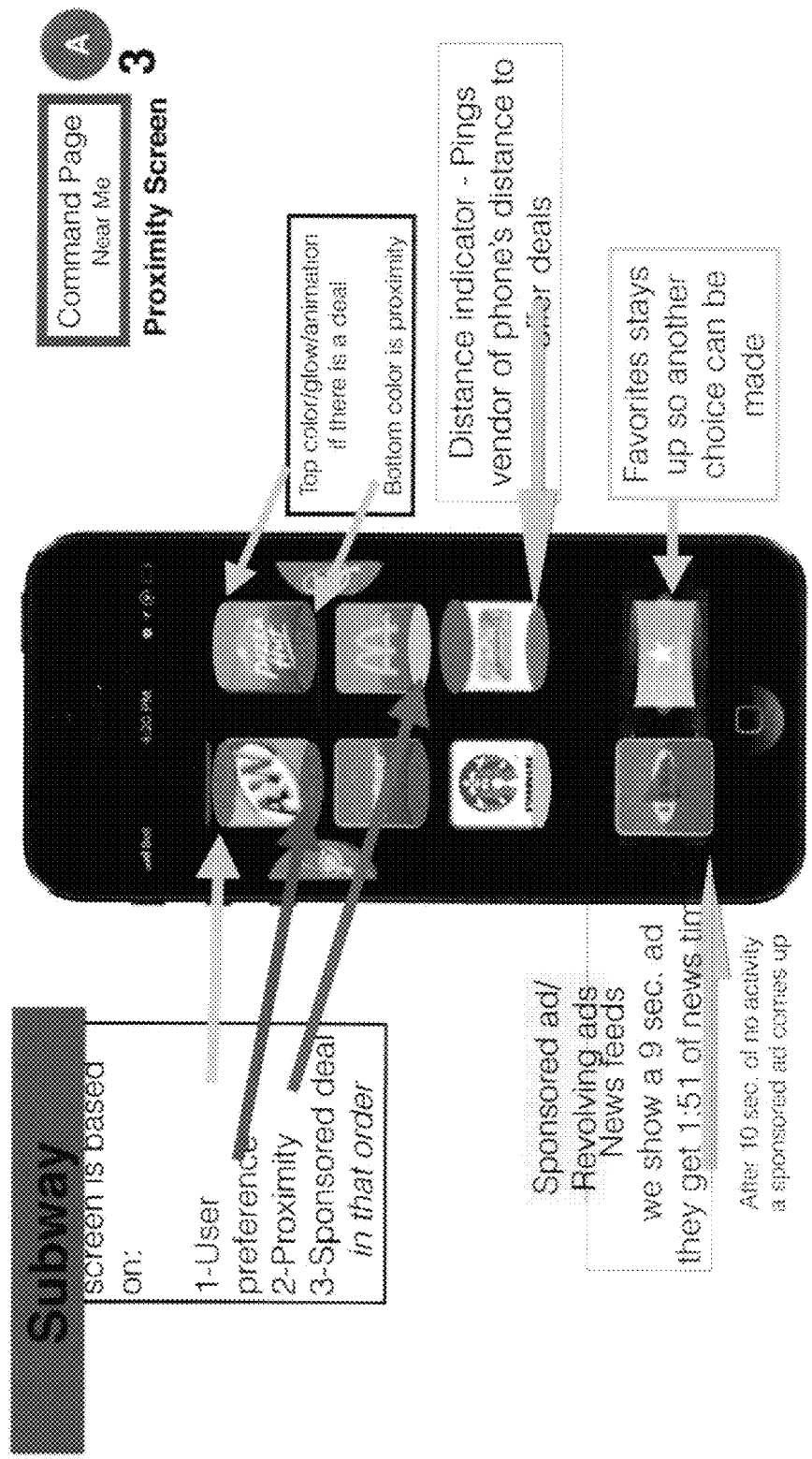

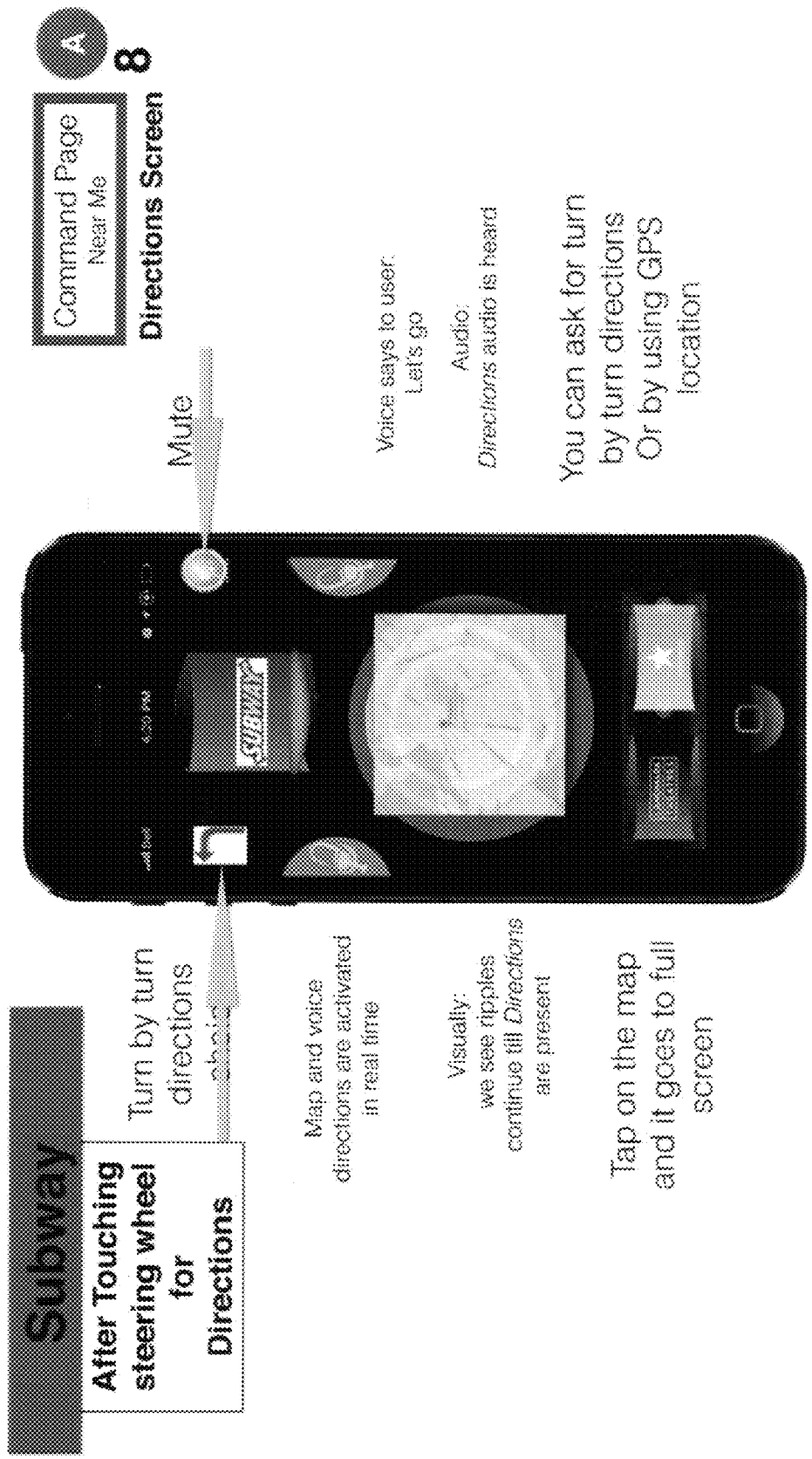

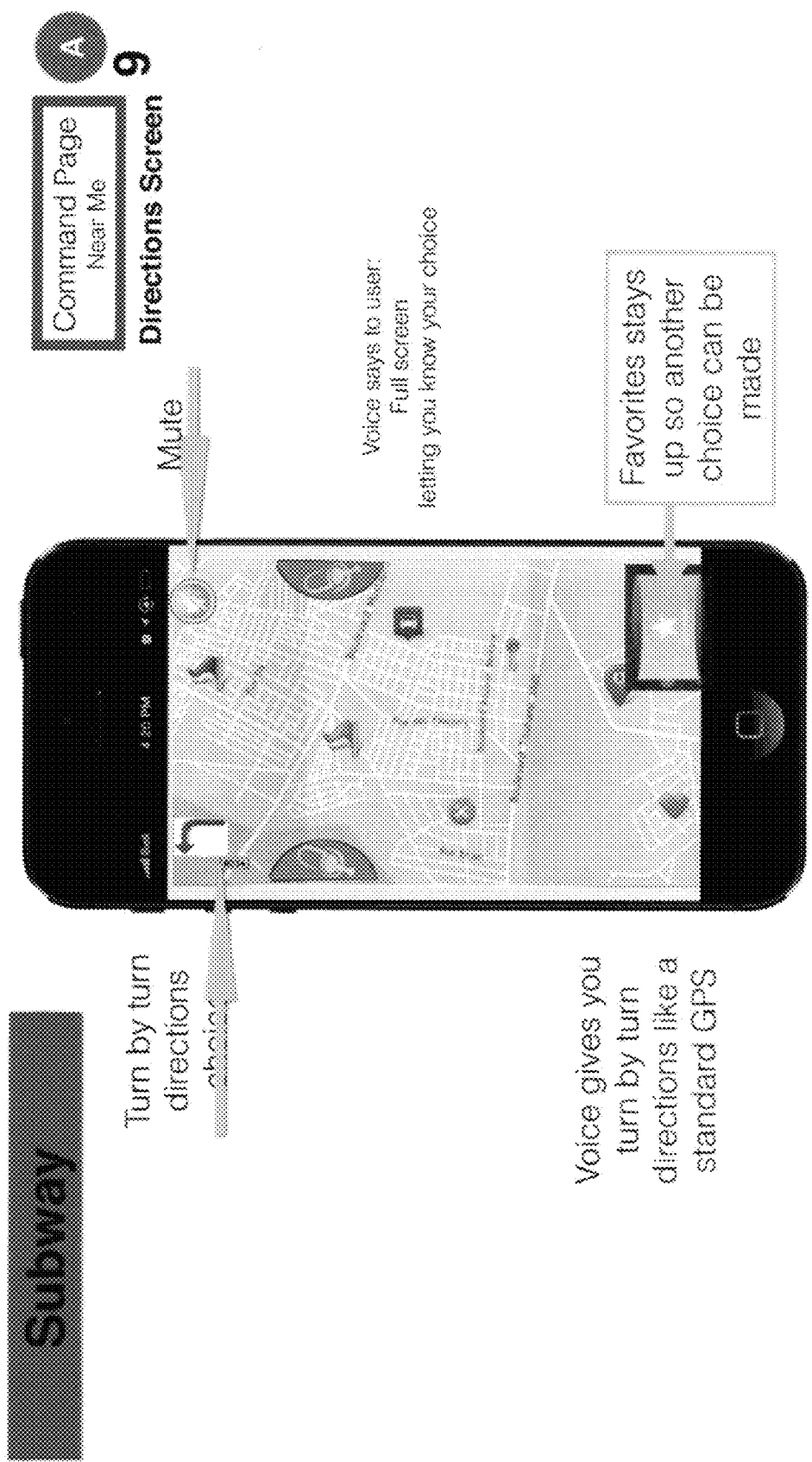

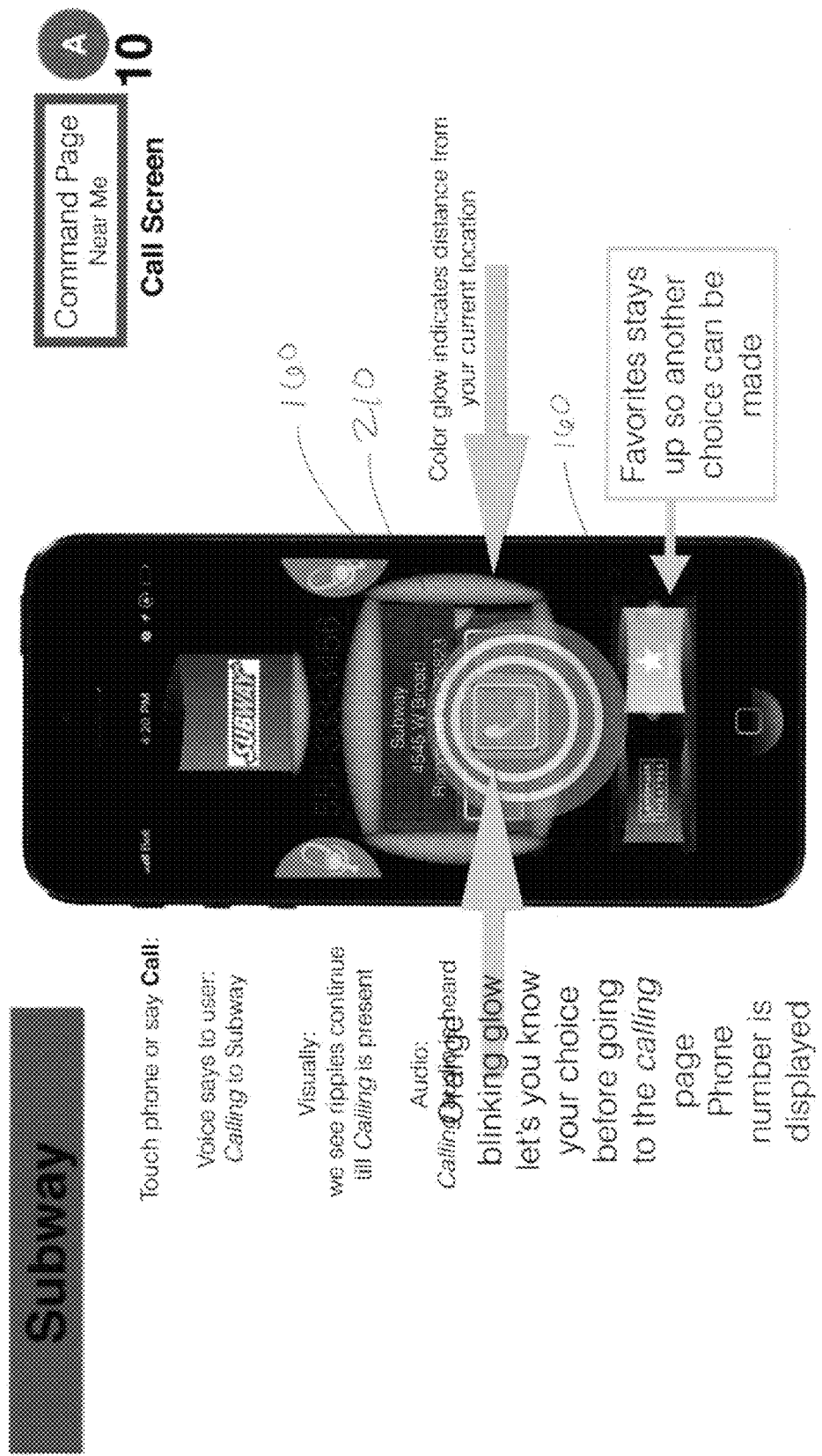

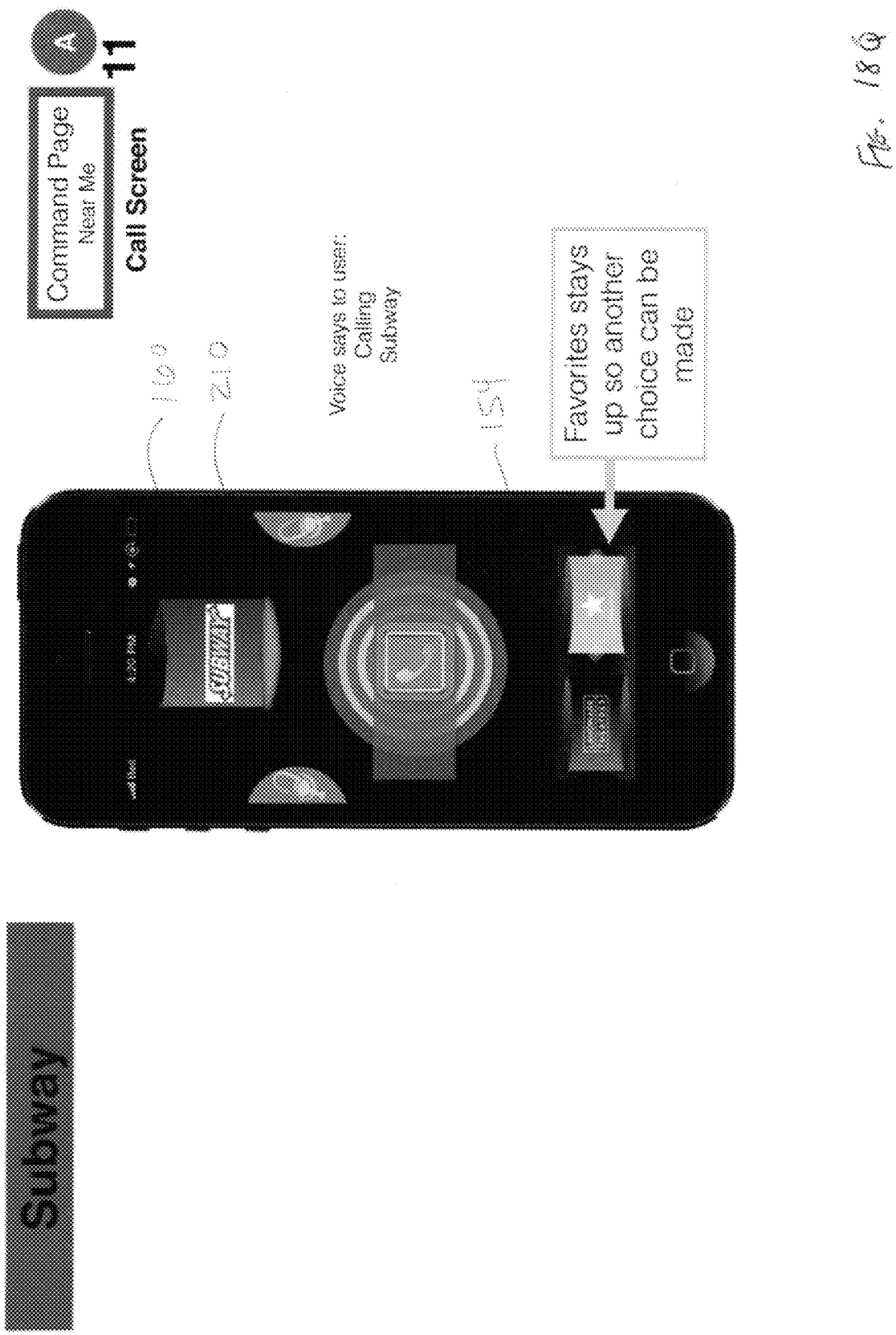

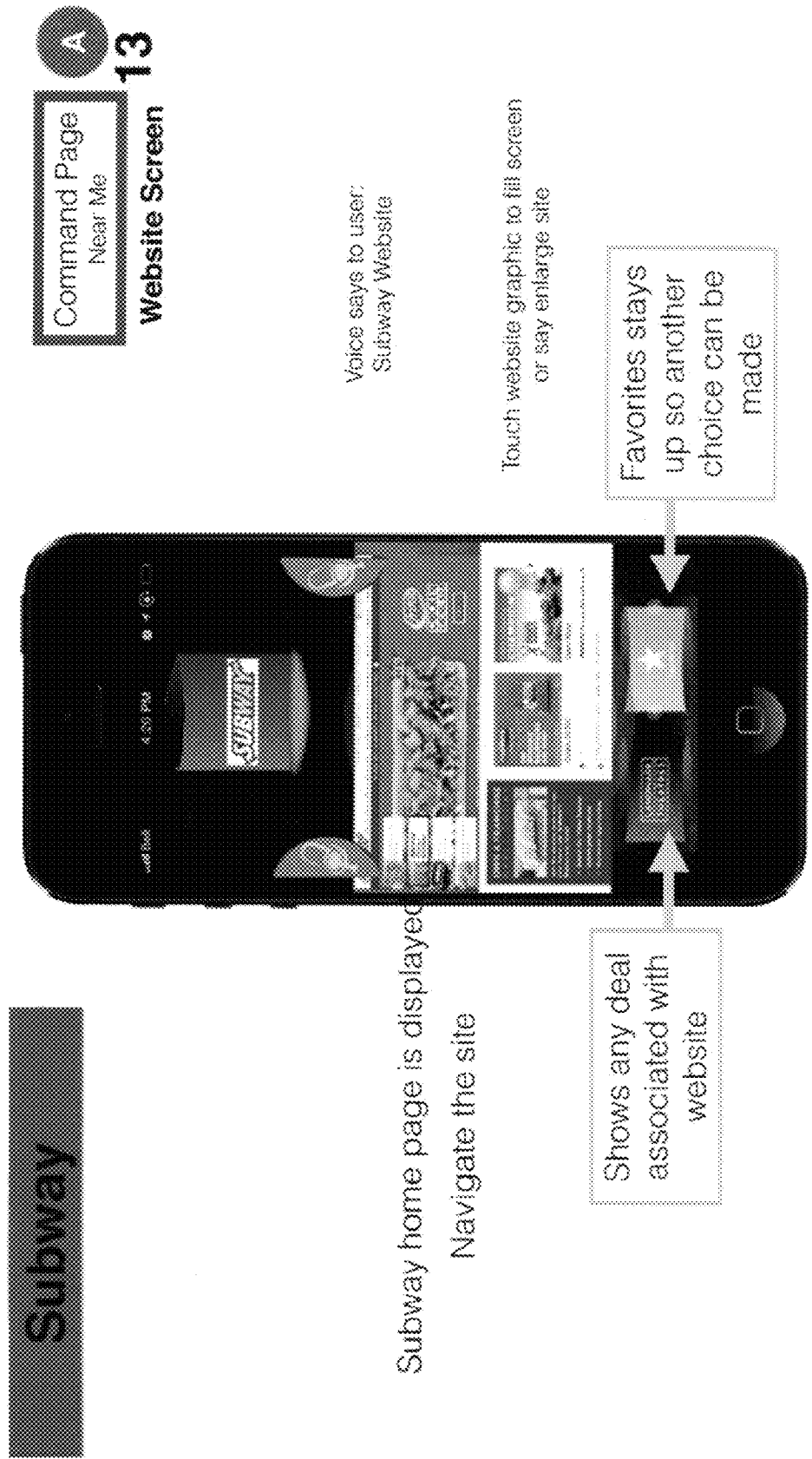

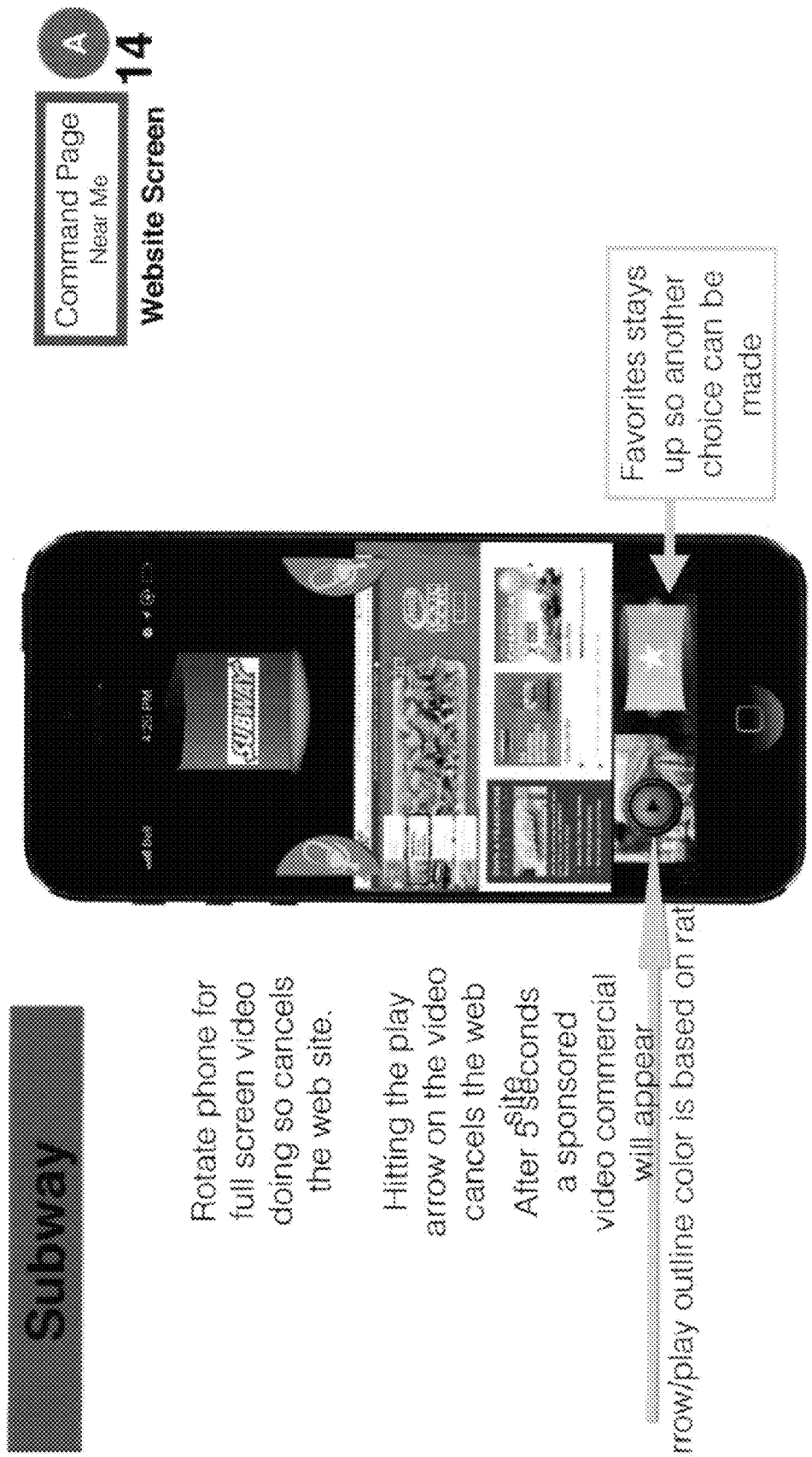

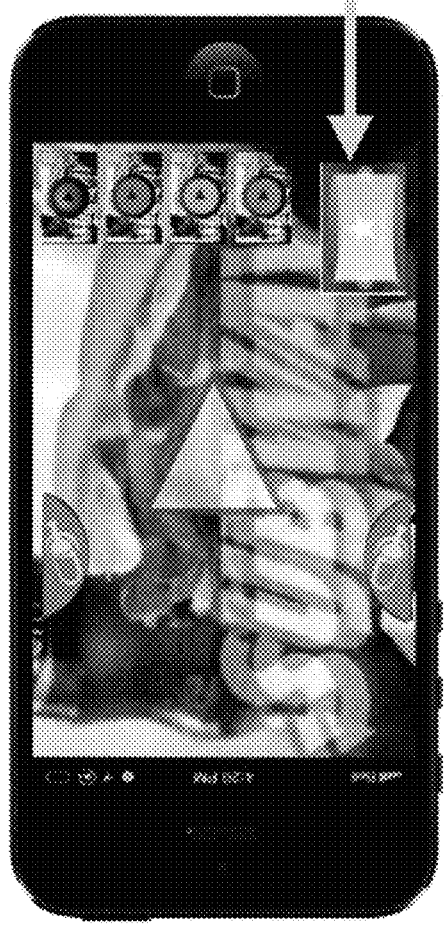

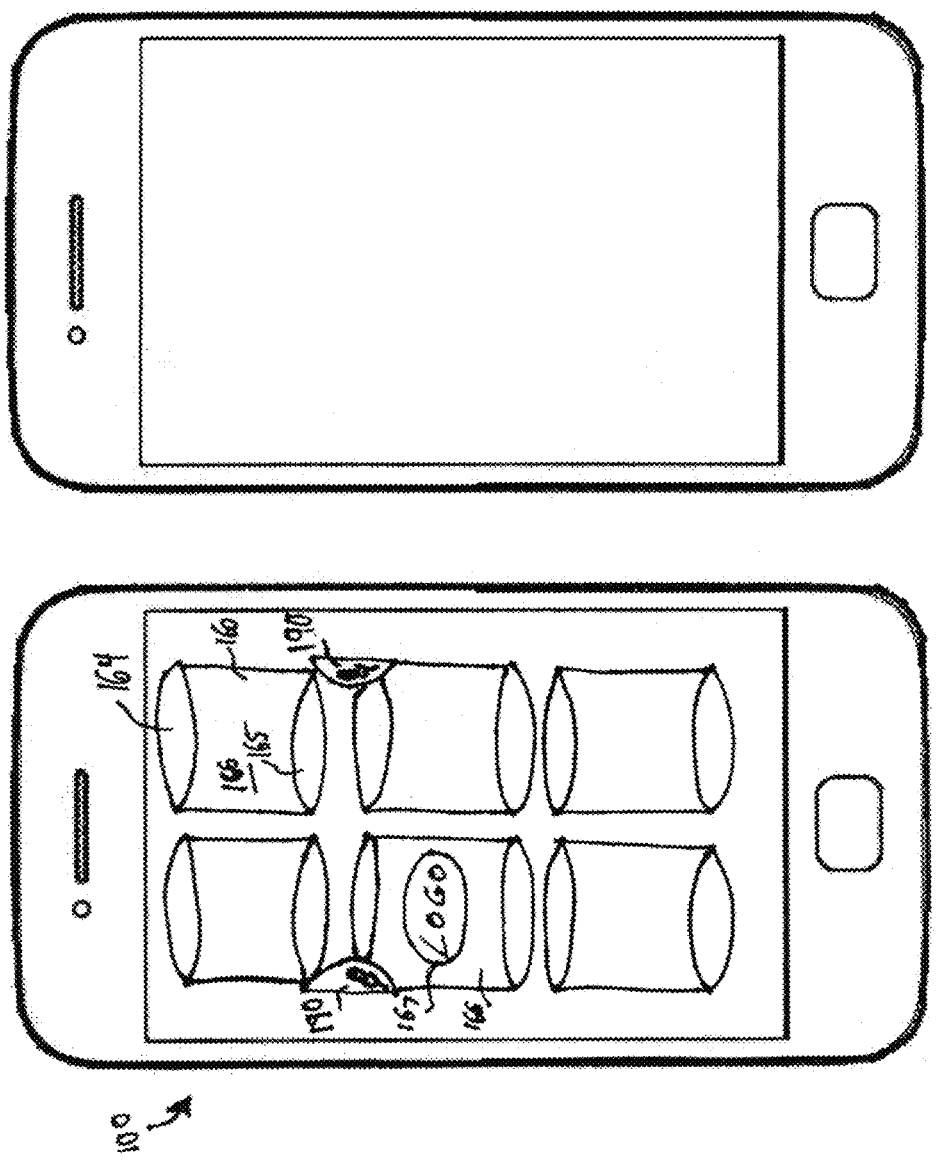

MOBILE COMPUTING SYSTEM WITH USER PREFERRED INTERACTIVE COMPONENTS

CLAIM OF PRIORITY UNDER 35 U.S.C. §§119 (e)

This application claims priority to U.S. provisional application Ser. No. 61/986,175 titled "Interactive icons for graphic user interface" and filed Apr. 30, 2014; and U.S. provisional application 62/017,517 titled "interactive mobile device application for seeking information" and filed Jun. 26, 2014. Both aforementioned provisional applications are incorporated herein in their entirety.

FIELD OF THE INVENTION

The present invention is directed generally to computing environments and more particularly to a mobile computing system having user preferred interactive components.

BACKGROUND

Consumers increasingly seek information and shop via mobile devices. Online browsing can be done at any time and at any place without restriction. Users seek information that is specifically tailored to their needs and that they can personalize. In addition, instant access to information is a critical tool in the current global social climate and business environment. Interactive communication in a user-friendly format and highly available access to and dissemination of information represents a competitive advantage, Instant online communication creates valuable opportunity.

The current state of technology focuses on devices that use a variety of user interfaces to disseminate and display information. Computers, cell phones, tablets, MP3 players, other mobile devices, and other electronic devices use graphical user interfaces having a display screen to convey certain data.

In addition the widespread use of satellite and global positioning devices (GPS) can be utilized by the mobile devices to locate hotels, restaurants, gas stations, stores and other places. Prior art does not provide, however, a system and method that can utilize all of the above enumerated features such that the users and consumers of mobile devices can maximize the available information and customize them as appropriate.

SUMMARY

A method and associated device is provided for providing context based information to a user. The device is a mobile device and information is provided on a display to a user. In one embodiment, the mobile device enabled to receive input and in processing communication with one or more computers and comprising the steps of storing a user profile having at least information about a plurality of stores; creating a plurality of icons such that each icon at least includes one store; determining if more than one store should be represented under same icons; dynamically updating information about each store represented by said icons to see if a special condition can be associated with any of the stores represented by the icons; and displaying said plurality of icons on a display of the mobile device and adding a special effect to any icon that includes a store identified as having a special condition.

In another embodiment, the mobile device has at least a processor and a display component, said mobile device being in processing communication via the processor with at least one computer and is enabled to receive user input. The processor is configured to store a plurality of preselected preference options in a storage location and can create a plurality of icons to represent one or more of the preference options. The processor determines if more than one preference option can be categorized together and represented under a same icon and displays the icons on a display in processing communication with the mobile device. Upon receiving user input, the processor displays on the display device the created icons. The processor dynamically updates information about each of the preference option represented by the icons to see if a special condition can be associated with any of the preference options represented by the icons; and adds a special effect to any icon that includes a default option identified as having a special condition.

BRIEF DESCRIPTION OF THE DRAWINGS

FIG. 20 is an example embodiment with a plurality of icons on a mobile device.

DETAILED DESCRIPTION

Figure 1:
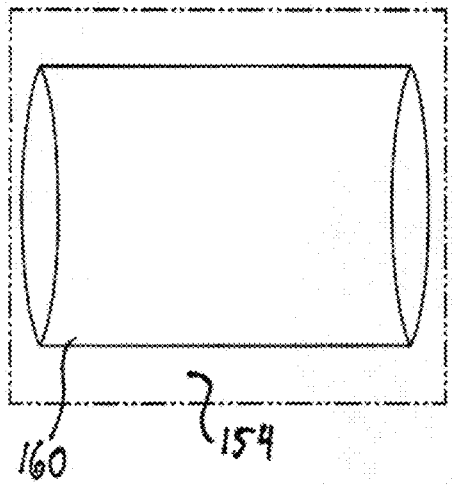
FIG. 1 is a front elevation view of a portion of a communications terminal display screen showing a three-dimensional pillow shaped icon.

The present invention references a mobile device. As generally understood a mobile device can be a computer that includes one or more processor and can include or be in processing communication with a display and user interface device. A mobile device can include a variety of apparatus, including but not limited to mobile phones and mobile tablets among others.

For a general understanding of the invention, reference is made to the drawings, FIGS. 1 through 17 herein. The matter shown in phantom, or dotted lines, illustrates environmental structure and forms no part of the claimed design. Reference numerals are used to designate elements as defined and described below. The present invention will be described by way of example and not limitation. Modifications, improvements and additions to the invention described may be determined after reading this specification and viewing the accompanying drawings; such modifications, improvements, and additions being considered included in the spirit and broad scope of the present invention and its various embodiments described or envisioned herein.

FIG. 1 provides an embodiment showing a front elevation view of a portion of a communications terminal display screen 155 of a graphical user interface showing a three-dimensional pillow shaped icon 160. The "glow", as used herein, represent certain information that a merchant wishes to communicate to the user.

As used herein, graphical user interface (GUI) is commonly known as type of user interface that allows a user to interact with an electronic device through graphical icons and visual indicators such as secondary notation, position, indentation, color and symmetry. The actions in GUI are usually performed through direct manipulation of the graphical elements by the user. The GUI is may be a touch screen display that is manipulated by movement of the finger of the user or by a stylus or by manipulation of a cursor, such as an electronic mouse. In certain instances, manipulation can be accomplished by either depressing or clicking on the icon and also by hovering the finger, cursor or stylus over the icon. As referred to herein, reference to manipulating the icon is accomplished by any of the mechanisms listed herein, is used interchangeably and includes any other means for manipulation of the graphical user interface.

In many instances, users prefer and are enabled to access the data by clicking on one or more icons provided on a display screen of a computers or mobile devices. Icons enable the user to proceed to the information they need. An object of some embodiments is to covey as much necessary information as possible to the user in as little amount of space as possible.

According to some embodiments, the icons 160 can be used with any GUI including computer monitors, tablets, cell phones, e-readers, hand-held devices such as MP3 players, portable media players, gaming devices, household appliances, office and industry equipment display terminals or any other devices that use a graphical interface to convey information and/or interact with the user. The GUI useful herein will typically be restricted to the scope of two-dimensional display screens. The display screen of the GUI can have any interface resolution.

The "icon" 160 as used herein is a component of a graphical menu that is displayed on the screen and is visually distinguishable from the background of the display screen 155. The icons 160 of some embodiments can be located or arranged in any manner on the display screen 155 of the GUI, and are not limited to any particular arrangement, grid, or matrix. Any number of icons 160 may be present on the display screen while maintaining useable screen space. The number of icons is limited only by the size of the device 100 with respect to the amount of available user screen space and the size of the icons 160.

In addition, as used herein, by "icon owner" is meant the entity that is being represented by a particular icon, for example, a company of any type, merchant, advertiser, brand, magazine, entertainment or news service, and any other entity whatsoever. Icons 160 may incorporate the name and logo of a merchant.

In some embodiments an icon 160 can be used to communicate information to the observer or user by displaying information in a manner disclosed herein. In some embodiments, information is displayed or expressed by the icon 160 "glowing" in order to indicate that certain information is intended to be communicated. As used herein, the term "glow" 210 refers to giving off of light or radiance that emanates from the icon 160 and is visually ascertainable and distinguishable on the display screen 155 of the device 100. In addition, the "glow" 210 as used herein, refers to various illustrative effects that emanate from the icon, such as those illustrated in FIGS. 14 through 17. In further embodiments, the glow is configured to various shapes, such as, but not limited to a splash 220, illustrated in FIG. 14, a star 222, illustrated in FIG. 15; bubbles 224, illustrated in FIG. 16, and a sun 226, illustrated in FIG. 17. The term "glow" 210 as used herein, also incorporates pop-out design 170. The invention is not limited to the shapes or pictorial effects illustrated by the drawings, and includes any other shapes or pictorial effects that may be pleasing to users or icon owners. Variation in different glow 210 types will allow different icon owners, merchants, for example, to distinguish their brands and the "look and feel" of their icons.

Figure 2:
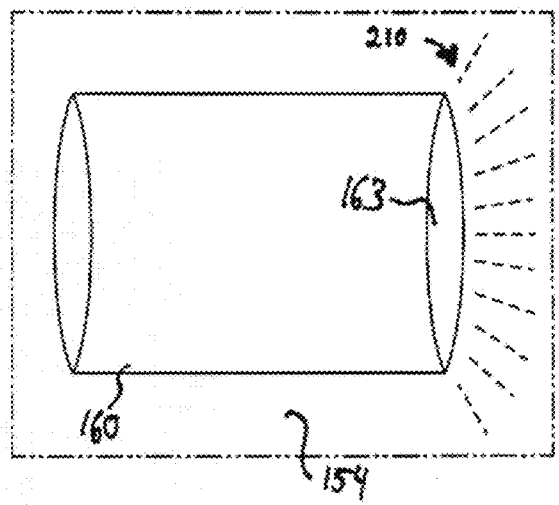
FIG. 2 is a front elevation view of an embodiment of the portion of the communications terminal display screen showing the three-dimensional pillow-shaped icon with a right side glow.
Figure 3:
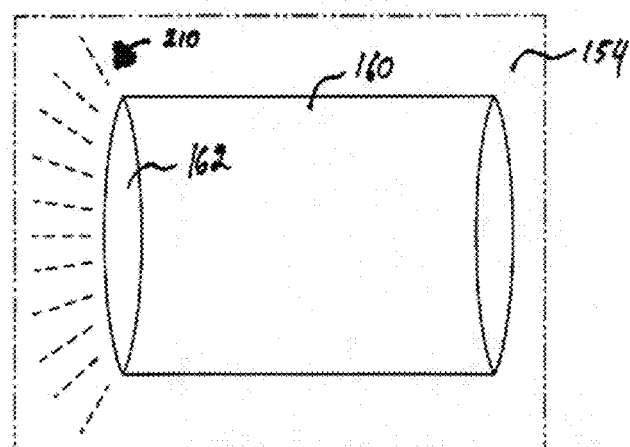
FIG. 3 is a front elevation view of an embodiment of the portion of the communications terminal display screen showing the three-dimensional pillow-shaped icon with a left side glow.
Figure 4:
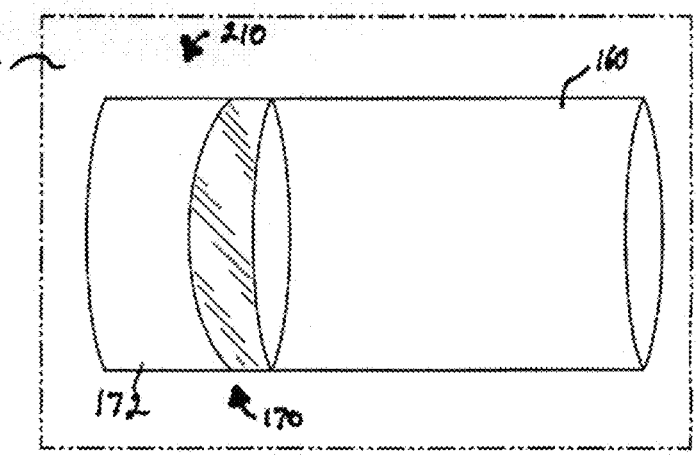
FIG. 4 is a front elevation view of an embodiment of the portion of the communications terminal display screen showing the three-dimensional pillow-shaped icon with a three-dimensional pop-out on the left side.
Figure 5:
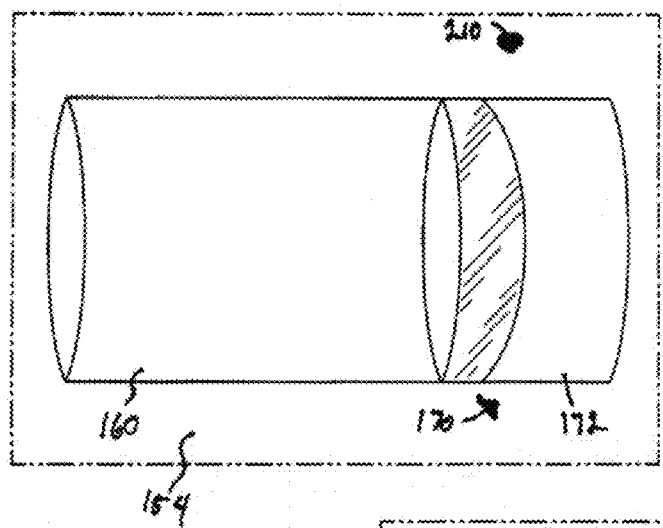
FIG. 5 is a front elevation view of an embodiment of the portion of the communications terminal display screen showing the three-dimensional pillow-shaped icon with a three-dimensional pop-out on the right side.
Figure 6:
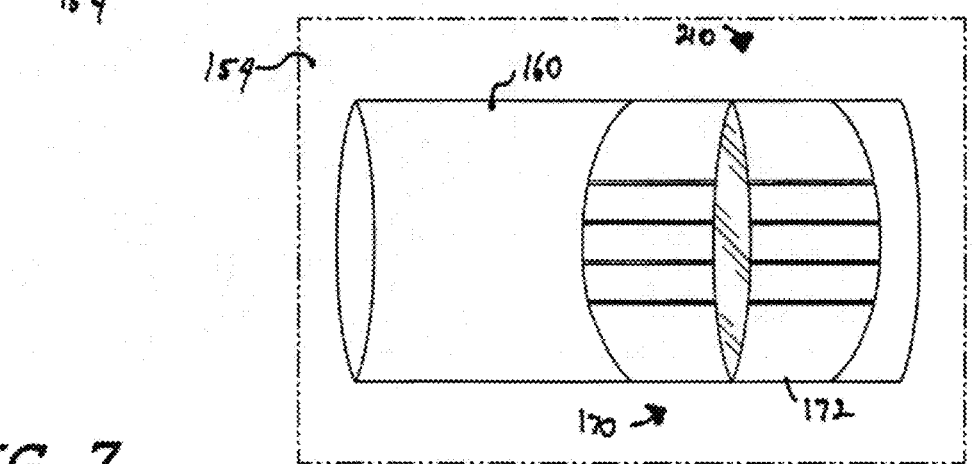
FIG. 6 is a front elevation view of an embodiment of the portion of the communications terminal display screen showing the three-dimensional pillow-shaped icon with a three-dimensional pop-out featuring a multi-button menu on the right side.
Figure 7:
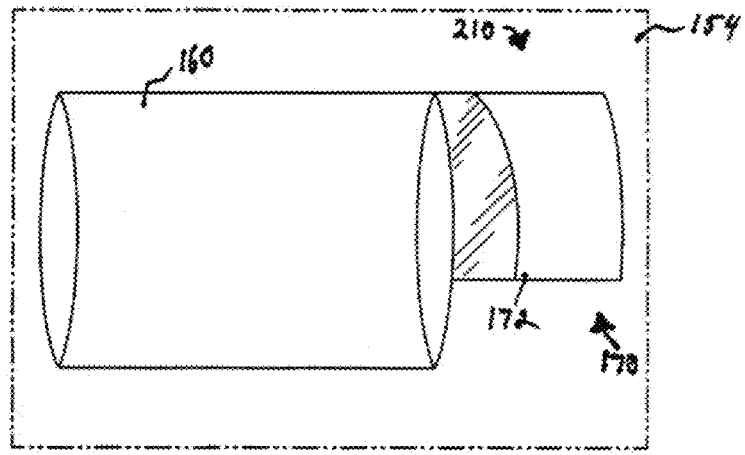
FIG. 7 is a front elevation view of an embodiment of the portion of the communications terminal display screen showing the three-dimensional pillow-shaped icon with a partial three-dimensional pop-out on the right side.
Figure 8:
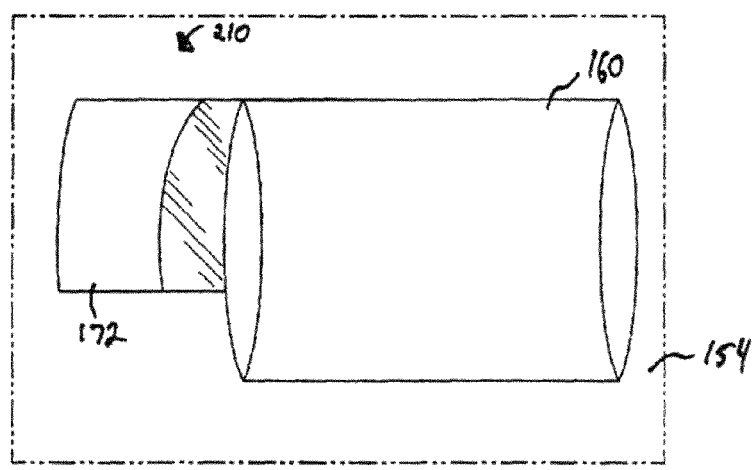
FIG. 8 is a front elevation view of an embodiment of the portion of the communications terminal display screen showing the three-dimensional pillow-shaped icon with a partial three-dimensional pop-out on the left side.
Figure 9:
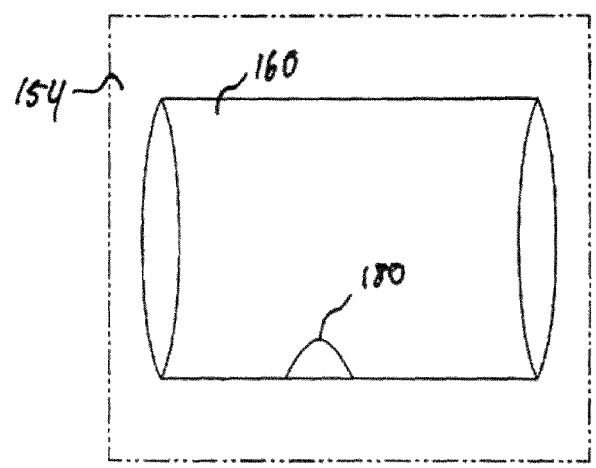
FIG. 9 is a front elevation view of an embodiment of the portion of the communications terminal display screen showing the three-dimensional pillow-shaped icon with a single triangular-shaped button.
Figure 10:
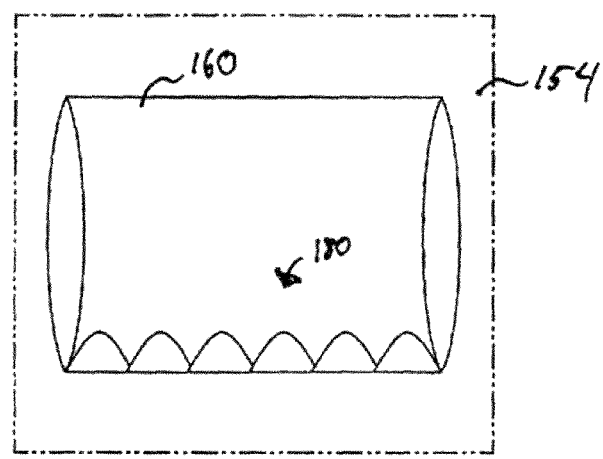
FIG. 10 is a front elevation view of an embodiment of the portion of the communications terminal display screen showing the three-dimensional pillow-shaped icon with a row of triangular-shaped buttons.

In some embodiments either the entire icon 160 will glow 210 or only segments or portions of the icon 160 will glow 210 according to various embodiments. FIG. 2 illustrates an embodiment where the left side 163 of the icon 160 is glowing as the icon 160 is located on the display screen 155 having orientation, and FIG. 3 is an embodiment where the right side 162 of the icon is glowing, or the opposite side of the icon of FIG. 2. Such arrangements can represent different pieces or categories of information being communicated by the same icon 160. In another embodiment, the icon 160 has pop-outs 170, illustrated in FIGS. 4 through 8, that convey information. When the user clicks on the glowing icon 160, a larger box 172 will appear showing information or further options. In other embodiments, shown in FIGS. 9 and 10, the icon 160 comprises a row of triangular shaped buttons 180.

Figure 11:
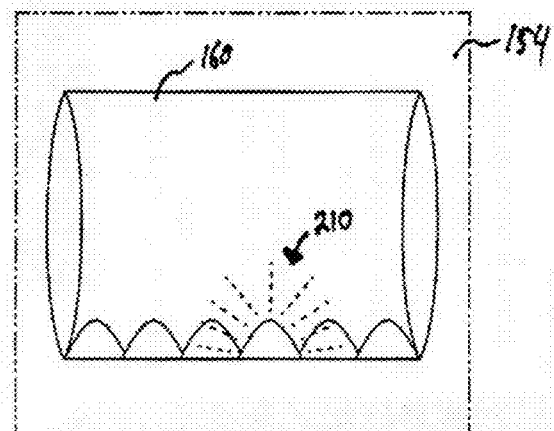
FIG. 11 is a front elevation view of an embodiment of the portion of the communications terminal display screen showing the three-dimensional pillow-shaped icon with a row of triangular-shaped buttons and one triangular-shaped button with a glow.
Figure 12:
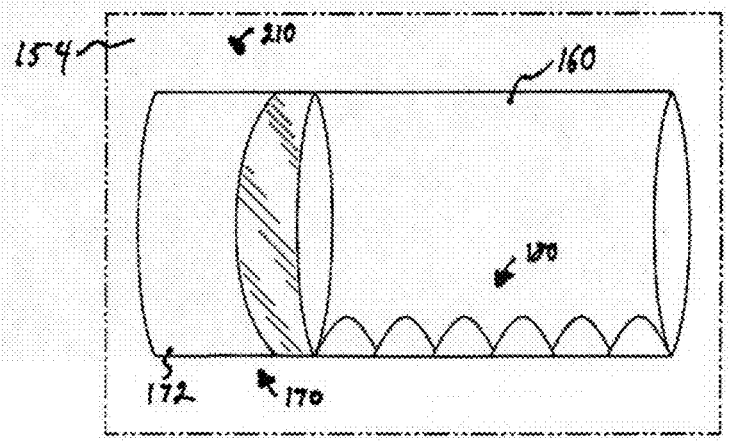
FIG. 12 is a front elevation view of an embodiment of the portion of the communications terminal display screen showing the three-dimensional pillow-shaped icon with a row of triangular-shaped buttons and a three-dimensional pop-out on the left side.
Figure 13:
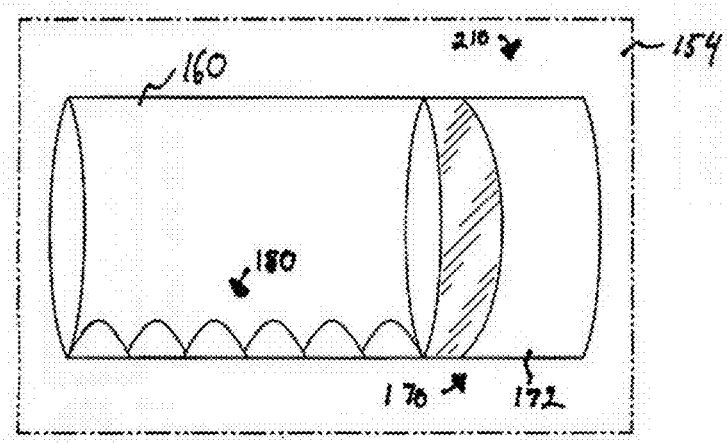
FIG. 13 is a front elevation view of an embodiment of the portion of the communications terminal display screen showing the three-dimensional pillow-shaped icon with a row of triangular-shaped buttons and a three-dimensional pop-out on the right side.
Figure 14:
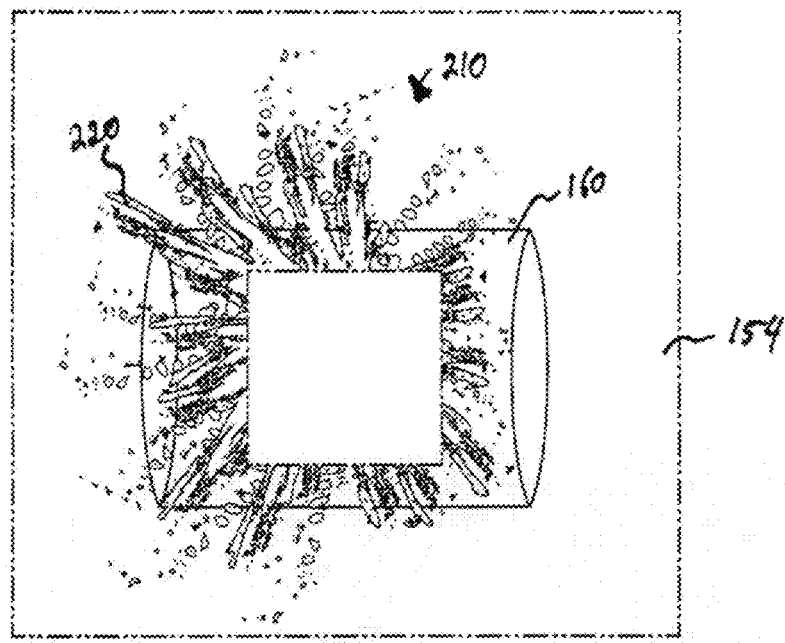
FIG. 14 is a front elevation view of an embodiment of the portion of the communications terminal display screen showing the three-dimensional pillow-shaped icon with a splash glow.
Figure 15:
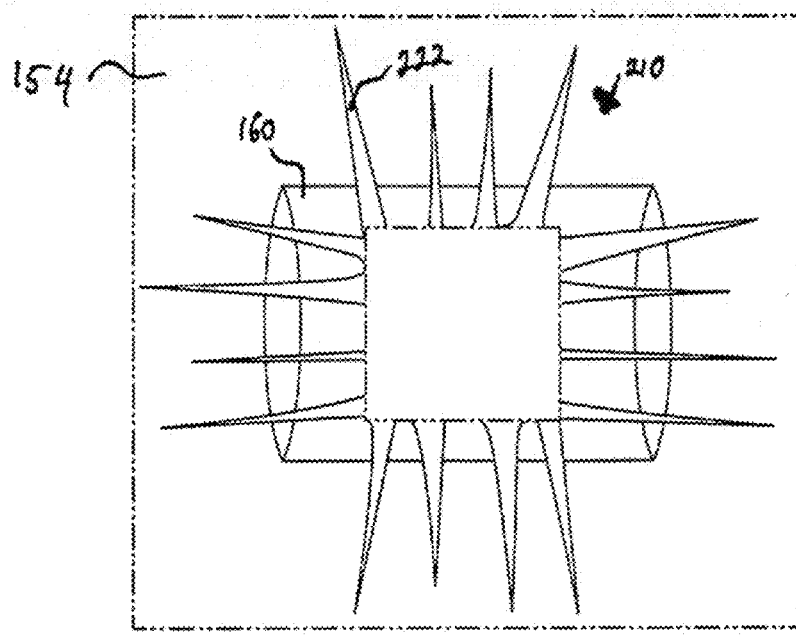
FIG. 15 is a front elevation view of an embodiment of the portion of the communications terminal display screen showing the three-dimensional pillow-shaped icon with a star glow.
Figure 16:
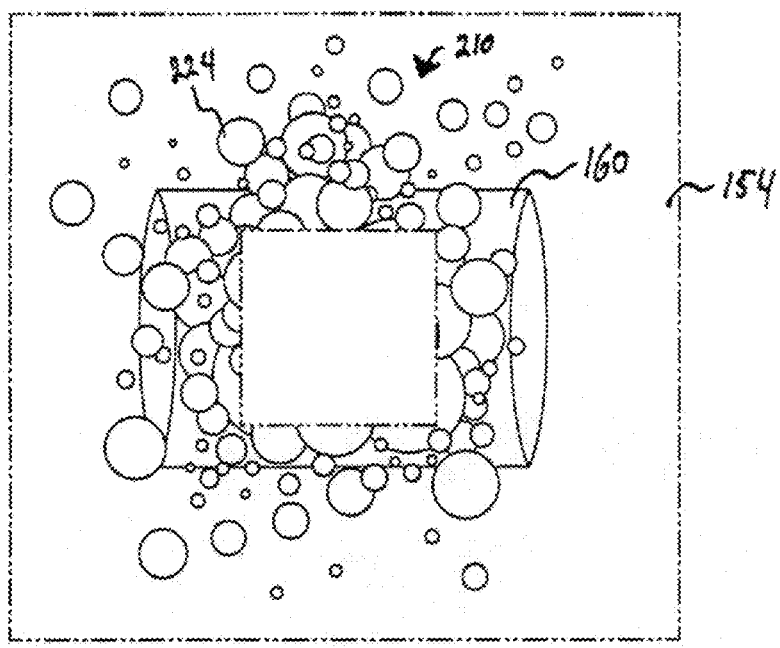
FIG. 16 is a front elevation view of an embodiment of the portion of the communications terminal display screen showing the three-dimensional pillow-shaped icon with a bubble glow.
Figure 17:
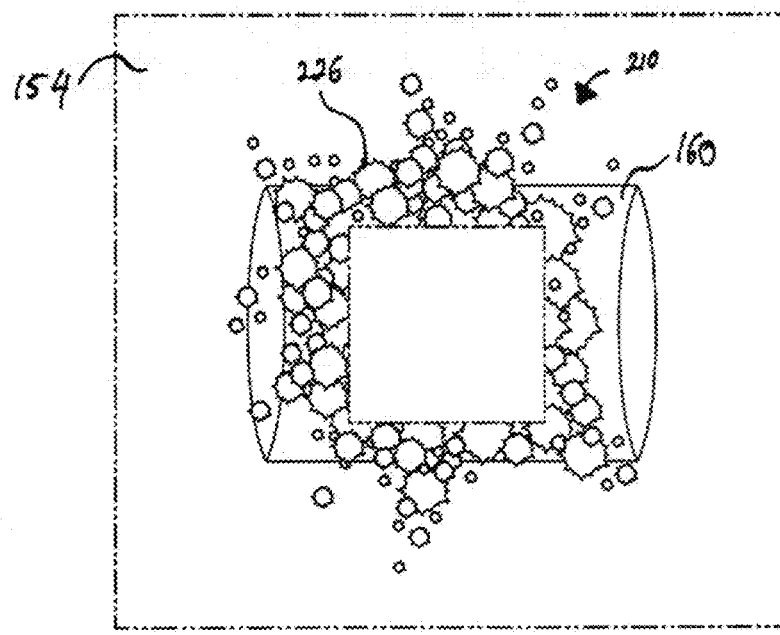
FIG. 17 is a front elevation view of an embodiment of the portion of the communications terminal display screen showing the three-dimensional pillow-shaped icon with a sun glare glow.

The various glow 210 types, such as bubbles 224, pop-out 170 and/or triangle 180, or any other elements, can be further combined in one icon in order to impart and communicate various categories of information to the user. This is shown in FIGS. 11, 12 and 13.

In some embodiments, selection can be made in a number of ways such as but not limited to hovering a finger, stylus or cursor over any of the icons 160 may trigger a glow 210, indicating that a user can interact with it. Alternatively, an icon 160 with an offer or other feature to communicate may glow 210 without a user hovering.

Information to be conveyed by the icon owner is typically contained on the owner's website, such as a merchant. A particularly useful application of some embodiments is directed toward providing advertising that enhance a personalized shopping experience.

In a number of other embodiment, additional features can be provided. For example:
  i. Game Appification—Engages users to interact with advertisers in a variety of game scenarios. Users can win rewards to apply to shopping or to share with friends.
  ii. Product Purchase—User buys a product through the website listing based on the advertiser's description and terms, without leaving the page.
  iii. Private Shopping Area—Isolated shopping area in which user information isn't shared with third parties. As user privacy is paramount, only users designated as VIPs can participate in this sector. Users obtain VIP status through the Membership sector.
  iv. Corporate Pages—These are complete pages by an advertiser where it may display its goods. For example, an athletic goods advertiser may have all athletes, sports gear, athletic gear, shirts, shoes, pants or shoes in one area.

In an alternate embodiment, a next group of sectors is defined, in part, by individual advertiser input and requests. These may include:
  v. Ad Placement—60/40 in the matrix—the top 2 lines—ad placement is organized by the user. Chosen advertisers and 40% relevant advertisers fill the additional matrix.
  vi. Memberships—Users may obtain and manage as basic members or VIPs.
  vii. Marketplace—The on-page delivery of the interactive advertising and shopping on a third party ("publishers") site via interactive marketplace windows that enable consumer to interact with the system, including purchasing without leaving the publisher's page.
  viii. Matrix—The main website display depicting advertisers accessible by one touch engagement as previously described.

In such an embodiment, as the user continues to interact with the system's dynamic icons 160 and other features, some embodiments provide increasingly personalized advertising and enhanced shopping to the user. To achieve this highly personalized form of website advertising and shopping, some embodiments have three primary components: 1) an online platform, composed of two key features: A) the matrix, a platform managed by the host and/or administrator of the system; and B) the marketplace, hosted and/or administered on a publisher's site; 2) Game Appification; and 3) Visual Voice, a voice recognition enabled platform for using the system via a mobile device.

Some embodiments include a voice activated application for use with mobile devices 100 such as a smart phone and tablets. The Visual Voice component enables command searches. For example, the user asks the application via voice command for a particular advertiser, store, or other advertiser in the local area. The application will then identify what the user has asked for and display, on the mobile device's screen 155, the logo of the particular advertiser the user requested in his voice command.

In this embodiment, the user can simply taps a logo and the mobile device speaks the address of the advertiser closest to the user. A double-tap on the logo will revert to a program, possibly provided by a third party company that provides directions and maps to the advertiser, store, or manufacturer's location. Visual Voice can be used to convey any other command to the system via voice command.

Figure 19:
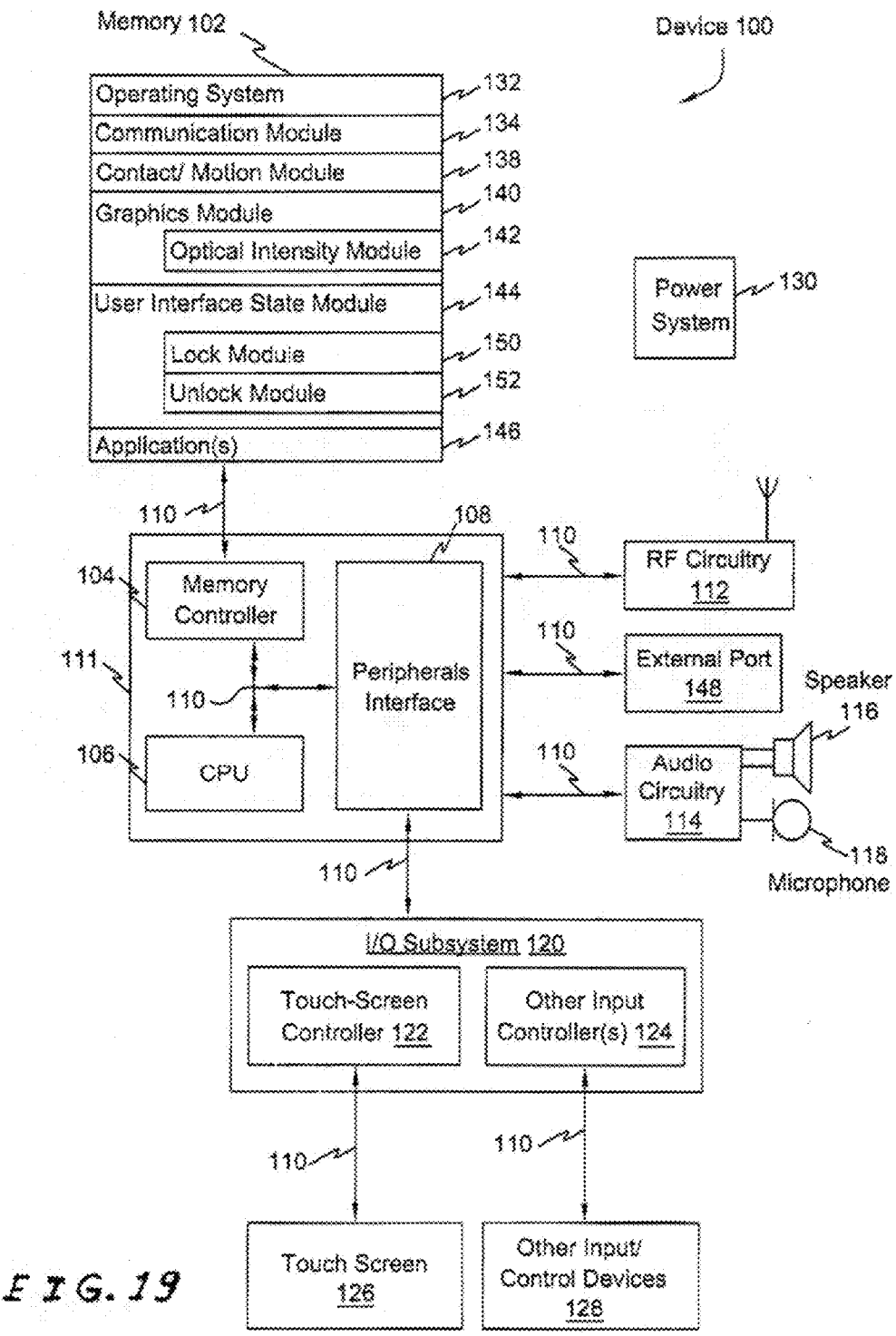
FIG. 19 is a system diagram of an embodiment of a mobile electronic device.

FIG. 19 illustrates an electronic device 100, according to some embodiments. The device 100 includes a memory 102, a memory controller 104, one or more processing units (CPU's) 106, a peripherals interface 108, RF circuitry 112, audio circuitry 114, a speaker 116, a microphone 118, an input/output (I/O) subsystem 120, a touch screen 126, other input or control devices 128, and an external port 148. These components communicate over the one or more communication buses or signal lines 110. The device 100 can be any portable electronic device, including but not limited to a handheld computer, a tablet computer, laptop computer, a mobile phone, a digital watch or other "wearables", a media player, a personal digital assistant (PDA), or the like, including a combination of two or more of these items, and one or more of these items may be a hand-held electronic communication device. It should be appreciated that the device 100 is only one example of a hand held electronic communication device 100, and that the device 100 may have more or fewer components than shown, or a different configuration of components. The various components shown in FIG. 19 may be implemented in hardware, software or a combination of both hardware and software, including one or more signal processing and/or application specific integrated circuits.

The memory 102 may include high speed random access memory and may also include non-volatile memory, such as one or more magnetic disk storage devices, flash memory devices, or other non-volatile solid state memory devices. In some embodiments, the memory 102 may further include storage remotely located from the one or more processors 106, for instance network attached storage accessed via the RF circuitry 112 or external port 148 and a communications network (not shown) such as the Internet, intranet(s), Local Area Networks (LANs), Wide Local Area Networks (WLANs), Storage Area Networks (SANS) and the like, or any suitable combination thereof. Access to the memory 102 by other components of the device 100, such as the CPU 106 and the peripherals interface 108, may be controlled by the memory controller 104.

The peripherals interface 108 couples the input and output peripherals of the device to the CPU 106 and the memory 102. The one or more processors 106 run various software programs and/or sets of instructions stored in the memory 102 to perform various functions for the device 100 and to process data.

In some embodiments, the peripherals interface 108, the CPU 106, and the memory controller 104 may be implemented on a single chip, such as a chip 111. In some other embodiments, they may be implemented on separate chips.

The RF (radio frequency) circuitry 112 receives and sends electromagnetic waves. The RF circuitry 112 converts electrical signals to and from electromagnetic waves and communicates with communications networks and other communications devices via the electromagnetic waves. The RF circuitry 112 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 112 may communicate with the networks, such as the Internet, also referred to as the World Wide Web (WWW), an Intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS)), or any other suitable communication protocol, including communication protocols not yet developed as of the filing date of this document.

The audio circuitry 114, the speaker 116, and the microphone 118 provide an audio interface between a user and the device 100. The audio circuitry 114 receives audio data from the peripherals interface 108, converts the audio data to an electrical signal, and transmits the electrical signal to the speaker 116. The speaker 116 converts the electrical signal to human-audible sound waves. The audio circuitry 114 also receives electrical signals converted by the microphone 118 from sound waves. The audio circuitry 114 converts the electrical signal to audio data and transmits the audio data to the peripherals interface 108 for processing. Audio data may be retrieved from and/or transmitted to the memory 102 and/or the RF circuitry 112 by the peripherals interface 108. In some embodiments, the audio circuitry 114 also includes a headset jack (not shown). The headset jack provides an interface between the audio circuitry 114 and removable audio input/output peripherals, such as output-only headphones or a headset with both output (headphone for one or both ears) and input (microphone).

The I/O subsystem 120 provides the interface between input/output peripherals on the device 100, such as the touch screen 126 and other input/control devices 128, and the peripherals interface 108. The I/O subsystem 120 includes a touch-screen controller 122 and one or more input controllers 124 for other input or control devices. The one or more input controllers 124 receive/send electrical signals from/to other input or control devices 128. The other input/control devices 128 may include physical buttons (e.g., push buttons, rocker buttons, etc.), dials, slider switches, sticks, and so forth.

The touch screen 126 provides both an output interface and an input interface between the device and a user. The touch-screen controller 122 receives/sends electrical signals from/to the touch screen 126. The touch screen 126 displays visual output to the user. The visual output may include text, graphics, video, and any combination thereof. Some or all of the visual output may correspond to user-interface objects. The objects shown in FIGS. 1-18, for example may be soft keys or soft buttons for user input.

The touch screen 126 also accepts input from the user based on haptic and/or tactile contact. The touch screen 126 forms a touch-sensitive surface that accepts user input. The touch screen 126 and the touch-screen controller 122 (along with any associated modules and/or sets of instructions in the memory 102) detects contact (and any movement or break of the contact) on the touch screen 126 and converts the detected contact into interaction with user-interface objects, such as one or more soft keys, that are displayed on the touch screen. In an exemplary embodiment, a point of contact between the touch screen 126 and the user corresponds to one or more digits of the user. The touch screen 126 may use LCD (liquid crystal display) technology, or LPD (light emitting polymer display) technology, although other display technologies may be used in other embodiments. The touch screen 126 and touch-screen controller 122 may detect contact and any movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 126. The user may make contact with the touch screen 126 using any suitable object or appendage, such as a stylus, finger, and so forth.

In some embodiments, in addition to the touch screen 126, the device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the touch screen 126 or an extension of the touch-sensitive surface formed by the touch screen 126.

The device 100 also includes a power system 130 for powering the various components. The power system 130 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

In some embodiments, the software components include an operating system 132, a communication module (or set of instructions) 134, a contact/motion module (or set of instructions) 138, a graphics module (or set of instructions) 140, a user interface state module (or set of instructions) 144, and one or more applications (or set of instructions) 146.

The operating system 132 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module 134 facilitates communication with other devices over one or more external ports 148 and also includes various software components for handling data received by the RF circuitry 112 and/or the external port 148. The external port 148 (e.g., Universal Serial Bus (USB), FIREWIRE, etc.) is adapted for coupling directly to other devices or indirectly over a network (e.g., the Internet, wireless LAN, etc.).

The contact/motion module 138 detects contact with the touch screen 126, in conjunction with the touch-screen controller 122. The contact/motion module 138 includes various software components for performing various operations related to detection of contact with the touch screen 126, such as determining if contact has occurred, determining if there is movement of the contact and tracking the movement across the touch screen, and determining if the contact has been broken (i.e., if the contact has ceased). Determining movement of the point of contact may include determining speed (magnitude), velocity (magnitude and direction), and/or an acceleration (including magnitude and/or direction) of the point of contact. In some embodiments, the contact/motion module 138 and the touch-screen controller 122 also detect contact on the touchpad.

The graphics module 140 includes various known software components for rendering and displaying graphics on the touch screen 126. Note that the term "graphics" includes any object that can be displayed to a user, including without limitation text, web pages, icons (such as user-interface objects including soft keys), digital images, videos, animations and the like.

In some embodiments, the graphics module 140 includes an optical intensity module 142. The optical intensity module 142 controls the optical intensity of graphical objects, such as user-interface objects, displayed on the touch screen 126. Controlling the optical intensity may include increasing or decreasing the optical intensity of a graphical object. In some embodiments, the increase or decrease may follow predefined functions.

The user interface state module 144 controls the user interface state of the device 100. The user interface state module 144 may include a lock module 150 and an unlock module 152. The lock module detects satisfaction of any of one or more conditions to transition the device 100 to a user-interface lock state and to transition the device 100 to the lock state. The unlock module detects satisfaction of any of one or more conditions to transition the device to a user-interface unlock state and to transition the device 100 to the unlock state. Further details regarding the user interface states are described below.

The one or more applications 146 can include any applications installed on the device 100, including without limitation, a browser, address book, contact list, email, instant messaging, word processing, keyboard emulation, widgets, JAVA-enabled applications, encryption, digital rights management, voice recognition, voice replication, location determination capability (such as that provided by the global positioning system (GPS)), a music player (which plays back recorded music stored in one or more files, such as MP3 or AAC files), etc.

In some embodiments, the device 100 is a device where operation of a predefined set of functions on the device is performed exclusively through the touch screen 126 and, if included on the device 100, the touchpad. By using the touch screen and touchpad as the primary input/control device for operation of the device 100, the number of physical input/control devices (such as push buttons, dials, and the like) on the device 100 may be reduced. In some embodiments, the device 100 includes the touch screen 126, the touchpad, a push button for powering the device on/off and locking the device, and a volume adjustment rocker button. The push button may be used to turn the power on/off on the device by depressing the button and holding the button in the depressed state for a predefined time interval, or may be used to lock the device by depressing the button and releasing the button before the predefined time interval has elapsed. In an alternative embodiment, the device 100 also may accept verbal input for activation or deactivation of some functions through the microphone 118.

The predefined set of functions that are performed exclusively through the touch screen and the touchpad include navigation between user interfaces. In some embodiments, the touchpad, when touched by the user, navigates the device 100 to a main, home, or root menu from any user interface that may be displayed on the device 100. In such embodiments, the touchpad may be referred to as a "menu button." In some other embodiments, the menu button may be a physical push button or other physical input/control device instead of a touchpad. The particular embodiments described herein are not meant to limit in any way the scope of the claimed invention.

To aid understanding, one or more examples will now be provided to better illustrate one or more embodiments with the understanding that the operation of the present invention is not limited in scope to these examples alone.

EXAMPLES

Consumers also increasingly shop via mobile devices. Online browsing can be done at any time and at any place without restriction. Consumers expect personalization including special deals. Therefore, there is a need in the art for a highly personalized online advertising and shopping system that provides online consumers with advertisements through interactive games and other user-directed interactive means, as well as providing them with a fast, efficient way to purchase offered products.

In some embodiments special deals may include categories, for example, Hot Product may be a category, identified by the Fire Symbol, and may include a single item determined by an advertiser. For example a "shoe" may be the product about which the user wishes to get more information. When designating Hot Products, Advertisers may have the ability to choose: Demographics, Regions, Number of items sold, Day of the week/Time limit, Automatic rotation of advertiser products, Price. Advertisers may display one or more reasons for Hot Products, including but not limited to: New products, Seasonal, Timely, In the news, Limited quantity.

The mobile application of the present invention allows a user of the mobile device on which the app is loaded to ascertain the location of a particular venue, product or service, what deals or sales are associated with that product or service, and how the user can get to such venue or location of the product or service at any given time. The terms "application", "mobile application", "application software" and "app" are used interchangeably herein. The app can be located on any mobile device such as a smartphone, tablet, PDA (personal digital assistant), ultra-mobile PC, smartwatch, Google® Glass or any other device having a display screen and a touch input keyboard or touch screen interface. The mobile device operable with the app in some embodiments contains Wi-Fi, Bluetooth and GPS capabilities. The platform for the operation may be iOS 7 and greater and Android 4.0 and greater, or other suitable platforms.

The mobile application in some embodiments comprises a voice recognition capability that allows the user to speak the name of a desired venue, location, company, brand, or advertiser into the user's phone or other mobile device. Any deals, sales, news, products, or other event pertaining to that product or advertiser will appear on the graphic user interface of the display screen. By speaking to the application, users can locate vendors, ask for directions, or identify sales without having to fumble with their phone or dangerously divert their attention when driving. Further, the mobile application indicates the relevant information to the user both visually with pop-up boxes 170 and orally via sound capability. If the user travels on public transportation or spends time in a quiet area, the system's highly customizable interface allows the user to silence the voice playback system.

Any voice recognition and playback technology currently available may be operable. Voice recognition technology is used to recognize a voice signal as a signal which corresponds to a predetermined language, based on voice input by a user. Voice recognition technology has developed significantly. The range of voice signals which are recognizable through the voice recognition engine has expanded. While only a limited number of words were recognized in the past, recent voice recognition engines can now recognize relatively longer sentences and provide an improved degree of accuracy in voice recognition.

In some embodiments, the vocal interaction between user and application provides a quick, efficient, and safe means of learning about a new deal, sale, news, product, or other novel information from a particular provider or the user's selected advertiser. Users will neither have to waste time searching in web browsers to find deals for their favorite stores, nor will they need to fumble with a phone and tediously dig through menus to discover the latest hot deal.

The icon 160 designating the mobile application in some embodiments can be any shape or configuration. In some embodiments as designed herein, the icon has a generally pillow-shaped configuration, and may have a three-dimensional shape. FIG. 20 shows an icon 160 designating the mobile application in some embodiments having "eye" shaped designs at the top and bottom sides of the rectangular portion of the icon, while other embodiments may have "eyes" at the left and right sides of the rectangular portion of the icon or on all sides of the rectangular portion of the icon.

For example, the eye 164 at the top edge of the icon 160 may indicate a limited time offer, and the eye 165 at the bottom edge of the icon 160 may indicate a distance from the location of an advertiser. For example the eye 164 at the bottom edge of the icon 160 may glow a yellow, alerting the user that the advertiser featured on the particular icon has a location within a certain number of miles of the user's current position. By utilizing the mobile device's GPS capability, the application identifies the location of the particular advertiser and shows the distance and directions to that advertiser's location on the display screen. Users can customize the application to determine the search radius to be searched by the application. Further, the app's voice playback capability may speak the directions so that users do not have to handle a phone and look at a display screen while driving.

The information a user can learn from pressing an icon will differ with each company, brand, or advertiser. The type of information provided by a Subway® store may differ for information provided for a McDonald's® store, as an example, or for a brand clothing chain, as another example. The information may depend on the content that a particular merchant wishes to communicate via the app. Some examples of information that can be provided by the app include sales, deals, hot buys, news, products, as well as location to a particular vendor or store. The application alerts the user to this information through pop-out screens 170 and different graphical representations of the icon. Alerts can be delivered in various forms. In a embodiment, different portions of the icon will glow in certain colors depending on the type of information being relayed. This "glow" indicates to the user that information relevant to the user's interest exists and the user can discover this formation by interacting with the icon.

As such, the app of the invention can be customized by users to select categories of information of interest, such as a new product launch or a sale, and users can assign different types of glows to indicated different alerts.

Some embodiments can be such that it accounts for physical interaction with the system to obtain advertiser information. When the user travels to an area where voice commands become unavailable, he can perform a finger tap, or series of finger taps, to procure the desired information. For example, when an advertiser's logo appears on the main display screen, the user taps it once. This single tap leads the application to speak the advertiser's address aloud. The application then speaks turn-by-turn directions to that advertiser's location.

Alternatively, a touch on the icon 160 or voice command 190 instructs the application to display the advertiser's address in a text box. The app will then open a map in order to instruct travel directions to the user. The user may also set a predetermined default for a preferred map program. When the advertiser's address appears on the text box, the user may perform another touch on the address or voice command, prompting the application to open up the default maps application.

Additional embodiments provide the capability of storing photographs. Typically, photographs of a vendor can be displayed next to a vendor's icon. In the absence of a vendor's photograph of a vendor, the user may upload a photograph of the vendor's or the user's choosing.

According to other embodiments, the user will choose preferred vendors or other providers that will be stored within the memory 102. In addition, according to the embodiment, the mobile application software will keep track of a user's selections, preferences, browsing, and general shopping behavior. In conjunction with such embodiments, the app can be configured to incentivize repeated use by individual users by providing gamification opportunities. A vendor can provide rewards for frequent use, and affords special deals to repeat users of its app. Deals may become more exclusive and more appealing to the consumer with increased use of the system. As use becomes more frequent, either through voice commands or physical contact with the mobile device, the application may increase its personalization and gamification to the user. This allows the application to suggest particular products, goods, and services, and provide the same special deals or discounts the user prefers based on prior browsing and shopping history.

Example 2

Some embodiments provide a novel means for a user to search for a particular merchant. Users can select a merchant by typing or speaking the merchant's name into to the application. The application identifies the user's choice and displays the advertiser's logo on the app icon. Distance and directions to that merchant's store are found by further repeating the method as described. When a user is in travel, in the embodiment, the application will display only the stores that are in the direction of travel of the user. As a user approaches the destination of the merchant, the icon or portion of icon glows different colors, indicating additional information that may be of interest to the user. For example, when a user is a certain distance away, (for example, more than two miles), the glow 210 of the eye 165 at the bottom edge of the icon 160 may be a particular color, such as yellow. As the user gets within one mile to the merchant's store, the color may change to blue, or glow a more intense shade of yellow. When the user gets substantially close to the desired destination, (for example within a quarter of a mile), the color of the glow may change again, for example to a red or different shade of blue, or glow an even brighter yellow.

Further, at some point along the travel, eye 164 at the top edge of the icon 160 may alert the user as to whether the merchant destination has a special deal, sale, news, product, or other novel event. When the app has a preferred pillow-shaped configuration as described hereinabove, one or both eyes in the pillow-shaped icon may glow a unique color, for example a shade of green. The user can press the icon to learn more about the deal, sale, news, product, or other novel event. Alternatively, the application will speak to the alert to the user of such information. To learn more about the deal, sale, news, product, or other novel event, the user can press the icon, or provide a verbal command to the application. Either way, the application will then convey information about that advertiser's deal, sale, news, product, or other novel event to the user.

Example 3

Some embodiments include a voice recognition enabled platform for using the app via a mobile device. Through use of the mobile device's GPS capability, the application locates vendors situated near the user throughout a certain radius predetermined by the user. In the absence of a voice command, the application may select vendors based on the user's search and browsing history, but mainly by user preference. When the application completes the search, it populates the main interface with at least six vendors, but can display as many vendors as would be practically visible on the display screen, and additionally the user may scroll up and down the main interface. The app displays each individual vendor as a pillow-shaped icon. Each icon features the logo 167 of a particular vendor on the pillow-shape's front face 166. The icons 160 may be arranged in a grid-like lattice. Icons 160 may feature additional graphics which alert the user to useful information.

Users may not find what they need simply by browsing different vendors; instead, they may want information on a particular good, product, service, deal, or sale. When a user wants to search for a particular product, service, or vendor, he uses the search screen or the invention's voice recognition capability to search for the specific good, product, service, deal, or sale provides desired by the user.

When the application is ready to begin searching, it displays a search box on search screen. The search box has a first written message indicating that the application is ready to begin searching. The user may then manually type in on the keyboard of the mobile device the specific good, product, service, deal, or sale for which the user seeks information. Users may create search input via voice commands. The user speaks the name of a particular good, product, service, deal, or sale to the application.

The application's voice recognition capability acknowledges the name of the particular good, product, service, deal, or sale and displays it in search box. In the present example, the user wants to search for lamps. The search box also visually confirms lamps as its search parameter. The application's voice playback capability then speaks the name of the particular good, product, service, deal, or sale back to the user. The voice playback capability further informs the user that it is currently searching for lamps as indicated by the searching prompt.

When the search completes, the application transfers to a results screen and graphically displays all the vendors that sell lamps. The application can list results in a number of different ways: to vendors located throughout a certain radius predetermined by the user; by the user's favorite vendors; or by vendors having the best reputation as determined by members of the community, social media, or other rating system.

In continuing the search, a single vendor of the many located may interest the user. To select the individual vendor, a user may tap the icon with that vendor's logo, or say that vendor's name aloud. When the application recognizes the user's physical or verbal input, a menu or other pops-out 170 is displayed next to the selected icon 160. The menu contains information specific to that vendor. The menu includes a textual depiction of the vendor's name and address, but the menu may also contain the vendor's phone number, website address, as well as other forms of contact information. Underneath the address will be displayed a series of buttons each performing a separate function. One such button, indicated by a steering wheel icon, provides driving directions to the vendor's location. A button indicated by the telephone receiver icon, instructs the application to call that vendor at that location. A button depicted by a planet icon, instructs the application to open a third party map program and show the vendor's location on a map. Further, users may store this particular vendor as a "favorite" by selecting a "Favorites" button located on the menu. Users may revisit which vendors they have identified as favorites by selecting a separate favorites interface.

FIGS. 18A through U provide exemplary illustrations showing one or more views of an interactive user communication with a mobile device wherein the device provides the user a variety of information.

A user may activate voice input and voice output. In some embodiments a mute button is available for the output to enable use in an environment where the user does not want to be heard or disturb others.

A menu may be displayed in multiple formats. In one example a menu is displayed with the words "Near Me", "Brand", "Item", "Going To", "Premium", "Favorite Deal", "Special Deal", and "Sponsored Deal". In other embodiments a menu can be displayed as bubbles, icons, images, or abbreviations. In one embodiment abbreviations are used with "NM" meaning "Near Me", "Prem" meaning "Premium", "FAV" meaning "Favorite Deal", "Sp" meaning "Special Deal", and "SPD" meaning "Sponsored Deal". Each of these menu items represent a shortcut for searching for information with "Near Me" requesting information on store locations or deals that are physically close to the location of the user, "Brand" requesting a search for items, sales and information from a specific brand, which may include location information on where the brand is sold, "Item" requesting information on a specific item that may be sold under multiple brand names, the results may include locations of stores close by that sell item, "Premium" may search for deals pre-selected choices, which selection may be offered to members who have a premium account or to anyone who has made pre-selected choices, "Favorite Deal" searching that includes information based on stored preference information for the user, "Special Deal" searching for specific types of deals such as closeouts, liquidations, or other large discount deals or deals that are not expected to be seen on a recurring basis, and "Sponsored Deal" which may search for a deal offered by a sponsor of a service, including a sponsor of service providing the search results.

In other embodiments menu items may be color coded and may include a. Near Me=what's near me (Default screen, what is near me, Logos of pre selected brands that are close by proximity b. Seek=brand or item c. Where you want to go d. Premium=Pre selected choices e. Deals=Favorite, Special, Sponsored In some embodiments a user may select favorites and Favorites stays up so another choice can be made. A Favorites button may allow a rotating list of the user's favorite uses/app to appear.

Visual effects may indicate what items is active on a screen for audio cues. For example Audio cue happens with Blue ripples.

When a user Presses or says: Near Me, Near Me is highlighted on the screen in Green Audio sound to acknowledge that Near me is recognized. (specific sound to Near me command).

A slide selection feature may include: Selected locations etc. slide up from bottom with opacity at 100% at the top and 50% at the bottom till all are in place then each is at 100%, it may include an audio/sound—a roll up swish.

In an example the screen also displays in a portion of the screen Sponsored ad/Revolving ads. The user may also get News feeds—show a 9 sec. ad they get 1:51 of news time. After 10 seconds of no activity a sponsored ad may come up in a location on the screen.

In another example a restaurant is chosen when a microphone on the mobile device detects the name of the restaurant by voice, or by touching icon. Then Audio cue happens with Blue ripples. A user may change search item location or brand by touching the blue Mic.

In an example an Overview map to give some sense of proximity Showing current location and Pin of desired location. An audio voice:—You are 0.5 miles from this location In an example Blue ripples 214 around Selected Restaurant icon to show what is selected. Audio plays sound of blue ripple and indicates something is active.

Additional visual, color and audio cues may assist a user in selecting and navigating to a retail location or other business in the results of a search.

In some embodiments icons 160 have a color or glow 210 to indicate information on the top and on the bottom. In some embodiments the color on the top indicates a type of offer, for example Favorite=Lime green, Special=Orange, Sponsored=Blue, % off=Red, Price reduction=Yellow, and 2 for 1 deals=Purple. If there is a deal there is a glow at the top.

In some embodiments the bottom color indicates proximity to a user. For example: 0.25 miles=Green, 0.5 miles=Green, 1 miles=Green, 1.5 miles=Yellow, 2.0 miles=Yellow, 2.5 miles=Yellow, 2.5, –5 miles=Red, and 5 miles and beyond is no color. In some embodiments the user can set their own colors.

In some embodiments What's shown on screen as the result of a query is based on: 1 User preference, 2 Proximity, 3 Sponsored deal, in that order.

In FIG. 18A, an example is provided wherein the display device interacts with the user in accepting input and displaying output. The screen displays a group of default or alternatively previously stored user preference selections such as "brand", "item", "near me" etc. FIG. 18B provides more detailed information about each of the selections displayed in FIG. 18A. A user may press or say the options of "Near Me"; "Brand Item"; "Going To"; "Premium"; or "Deals" including "Favorite Deals", "Special Deals" and "Sponsored Deals". When a user selects "Near Me" they may be given a choice of what is near their location, which may be a default screen with logos of pre-selected brands that are close by proximity. When a user selects "Brand Item" they may be directed to a screen to seek for a brand or item. When a user selects "Premium" they may be shown pre-selected choices. When a user selects "Deals" they may be shown Favorite, Special, and/or Sponsored deals.

Figure 18C:
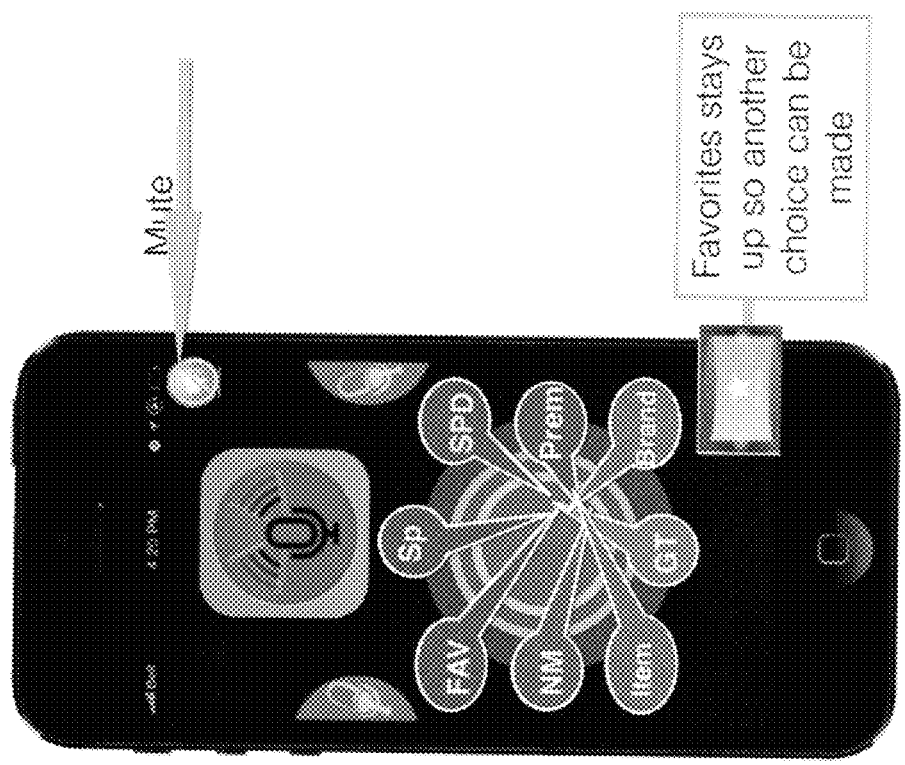
FIGS. 18A through U exemplary illustrations showing one or more snap shots of an interactive user communication with a mobile device wherein the device provides the user a variety of information.
Figure 18D:
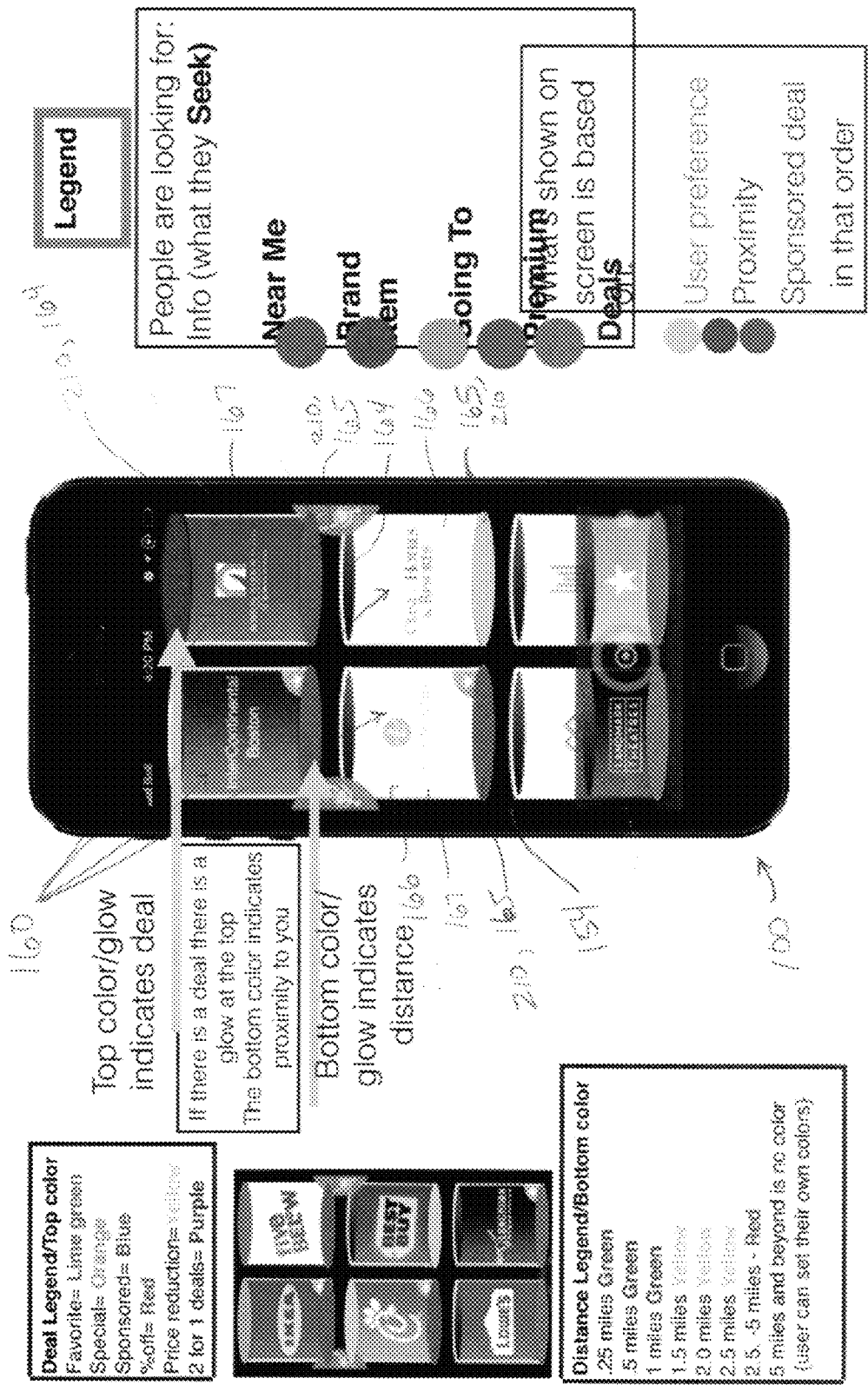

In FIG. 18C, the preselected favorites, in one embodiment, can be retrieved or identified while other selections can still be available to the user and displayed for maximum flexibility. In some embodiments "Favorites" stays up so another choice can be made by selecting the favorites button. FIG. 18D then displays selections using an icon. A variety of special effects, such as a glowing icon, mixed with one or more colors or other such effects can be used to grab the attention of the user and visually provide a variety of information very quickly.

Figure 18:
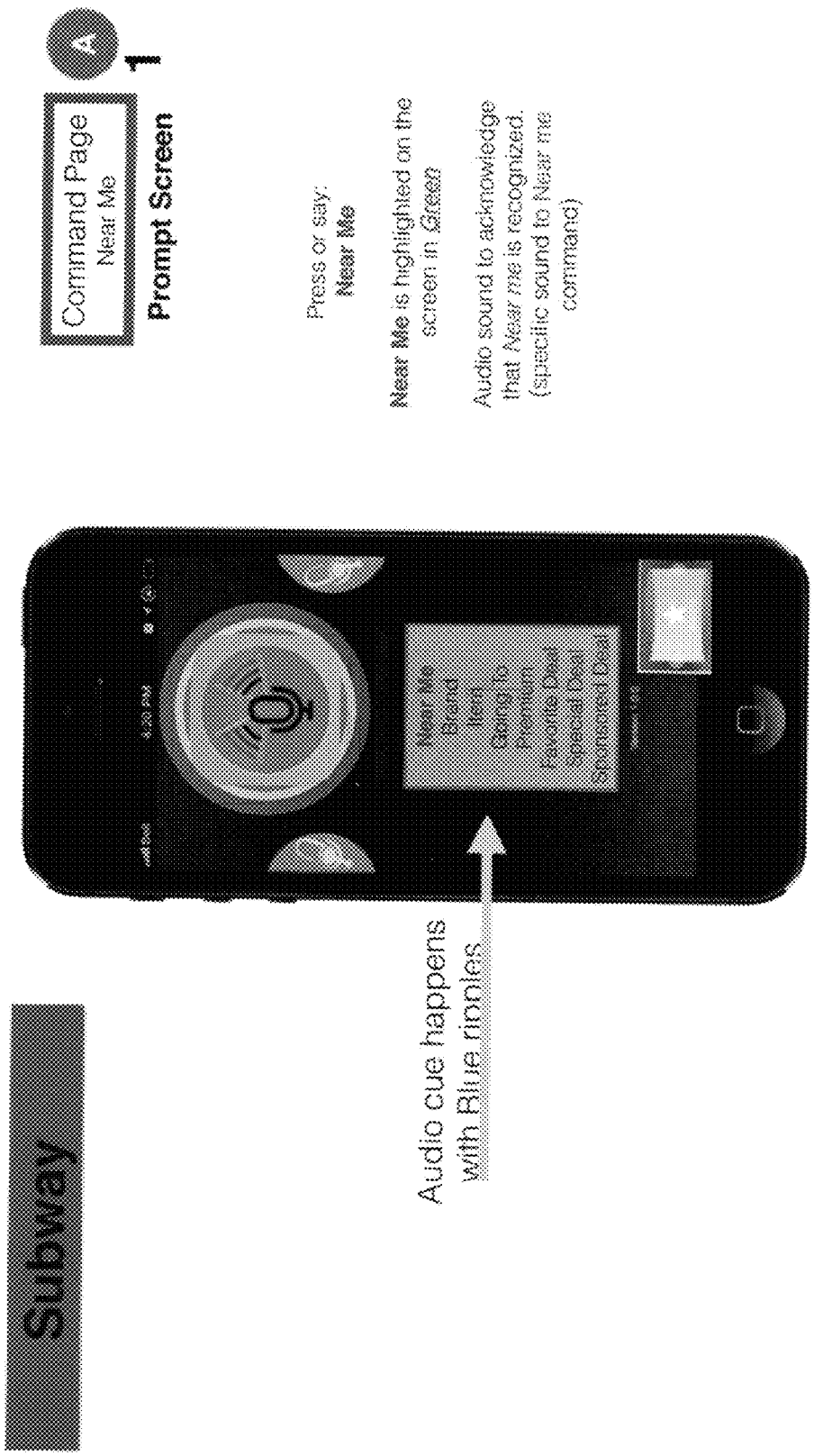
Figure 18:
Figure 18:
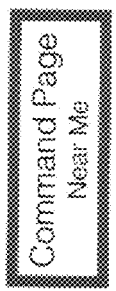
Figure 18:
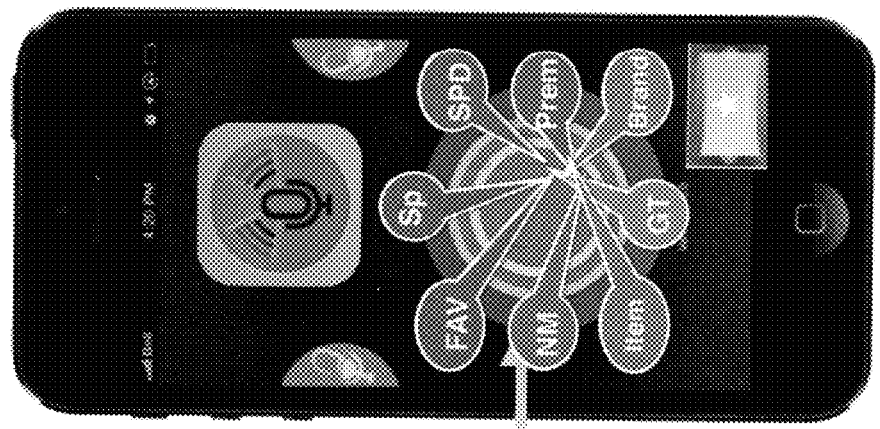
Figure 18:
Figure 18:
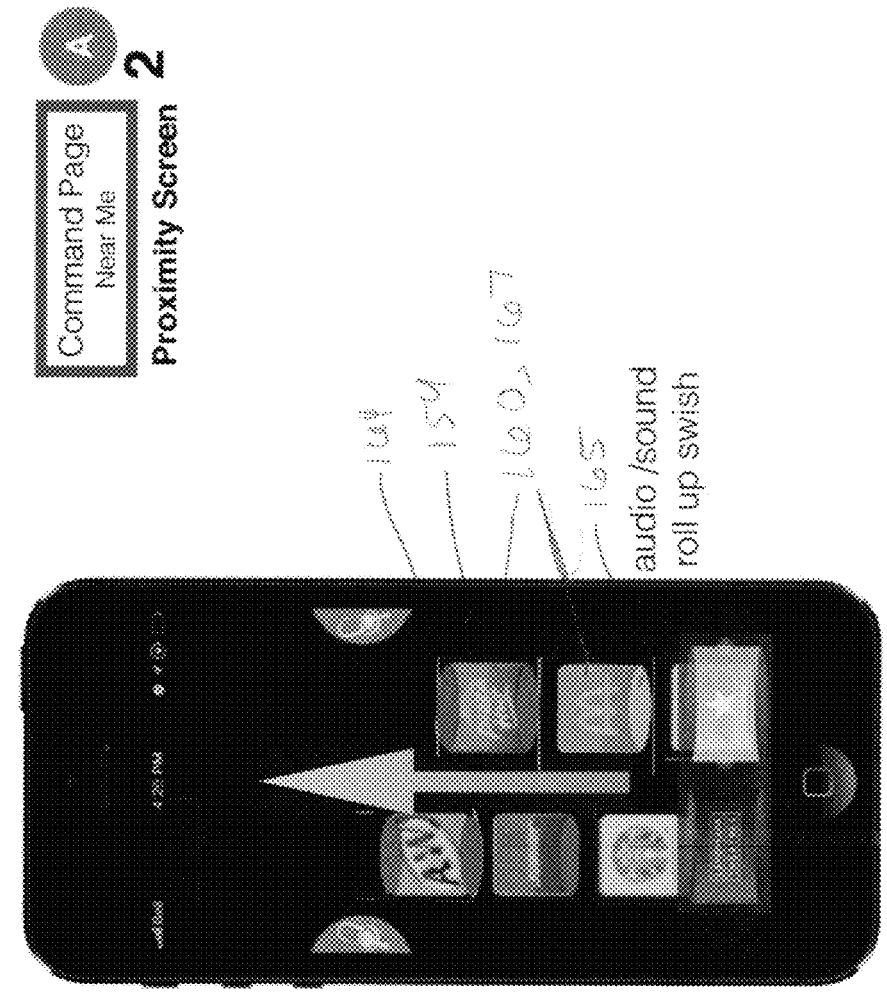
Figure 18:
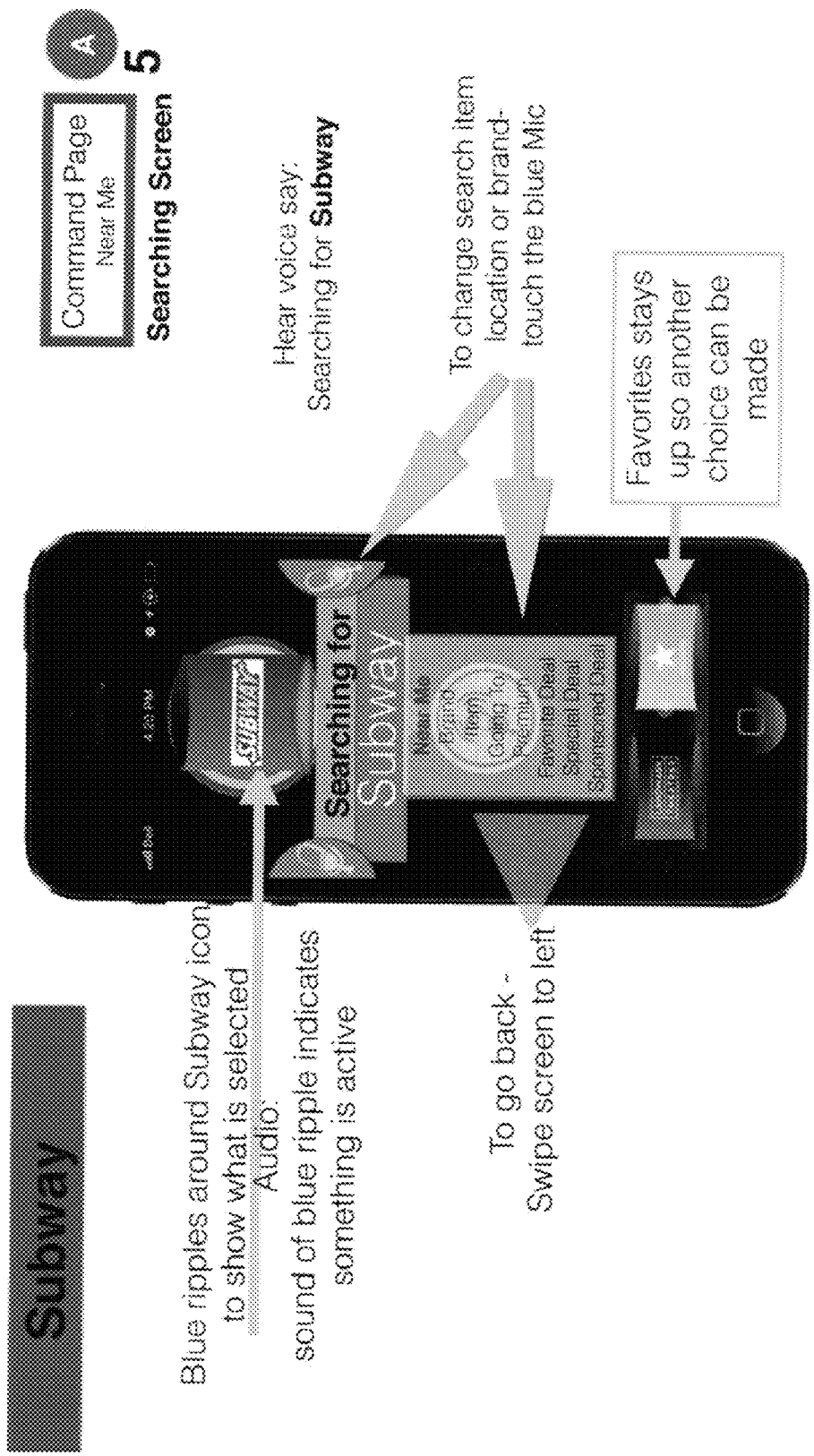

As illustrated in FIGS. 18 E and F, users can select each displayed icon through voice or another user input such as stylus, keyboard or even by hovering a finger above the display device. FIG. 18E may represent a "Command Page" for the command "Near Me". In some embodiments a user may hold (touch) the application icon for two seconds to start the voice application, or touch a microphone image on the side of the screen. When the voice application is touched, "airwaves" may animate as blue rippling circles around the voice application button. The button may also have animation such as red "V's". When the voice application is activated, an audio cue may happen, or be played. FIG. 18F may represent a first part of a Prompt Screen (1) for the Command Page—Near Me.

FIG. 18G may represent a second part of a Prompt Screen (1*a*) for the Command Page—Near Me. FIG. 18G illustrates how further output can be provided to the user via audio (and input can also be provided the same way by the user.) In some embodiments blue ripples or circles 214 may be shown around an area that is elected, and an audio cue may happen. The audio cue may state the options on the selected item.

FIG. 18H may represent a First Proximity Screen (2) for the Command Page—Near Me, and may be the next step after the Prompt Screen (1*a*). FIG. 18H shows how other selections can be made by rolling the display up or down. In some embodiments selected locations and other selections slide up from the bottom of the screen with opacity at 100% at the top and 50% at the bottom until all are in place, then each is at 100%. An audio or sound may be played to indicate the movement of the icon from the bottom to the top.

FIGS. 18I through K show the display as different selections are provided and made. FIG. 18I may represent a Second Proximity Screen (3) for the Command Page—Near Me, that may be after the First Proximity Screen (2) from FIG. 18H. The Second Proximity Screen may be based on 1—User preference, 2—Proximity, and 3—Sponsored deal in that order. A video player 208, such as a sponsored ad/revolving ads with news feed may be shown, and may activate after 10 seconds of no activity. In some embodiments the video player 208 may show a sponsored ad and news. For example the sponsored ad may be 9 seconds and then one minute and fifty-one seconds of a news feed, which would then repeat with another 9 second ad and another news feed and so forth.

FIG. 18J may represent a Third Proximity Screen (4) for the Command Page—Near Me. An icon representing a brand, such as Branded icon 212 representing Branded restaurant may be chosen by voice command or by touching the Branded icon 212. Blue ripples or circles 214 may animate behind the icon to indicate that the Branded icon 212 is selected, and an audio cue may play. The audio cue may be a voice that is heard to say "Subway". A user may touch the voice command 190 button shown as a microphone to change the search item location or brand.

FIG. 18K may represent a First Searching Screen (5) for the Command Page—Near Me. In some embodiments ripples or circles 214 around a selected icon 160 representing a brand such as Branded icon 212 may show that the Branded icon 212 is selected. An audio may be played of a sound associated with the ripples or circles 214 to indicate that something is active. A voice may also be played so that a user hears a voice say: Searching for Branded store. A user may change the search item location or brand by touching the voice command 190, or by touching an item on the navigation menu 216. A user may swipe the screen left to navigate back to the previous screen, which may be the Third Proximity Screen (4) as shown in FIG. 18J.

Figure 18L:
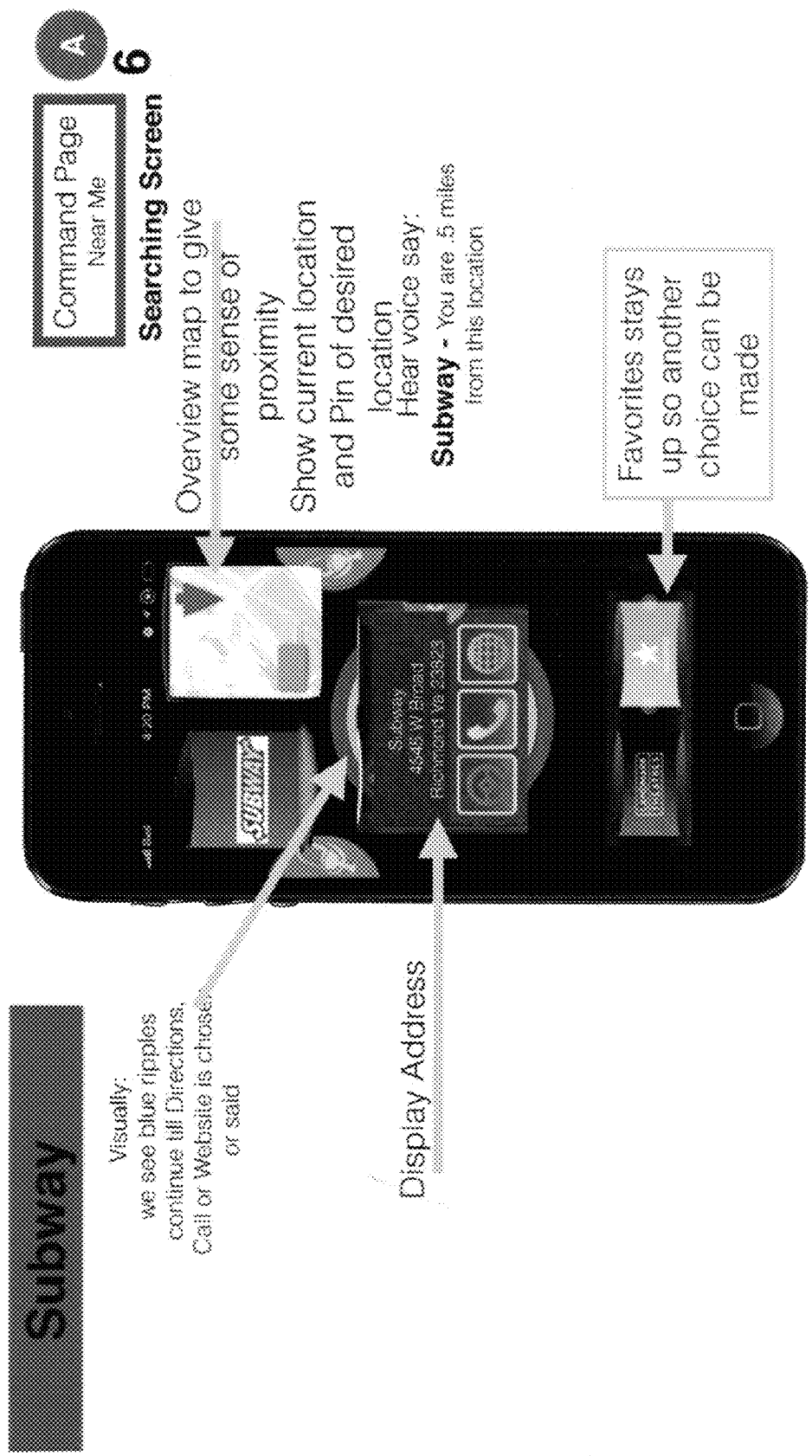
Figure 18:
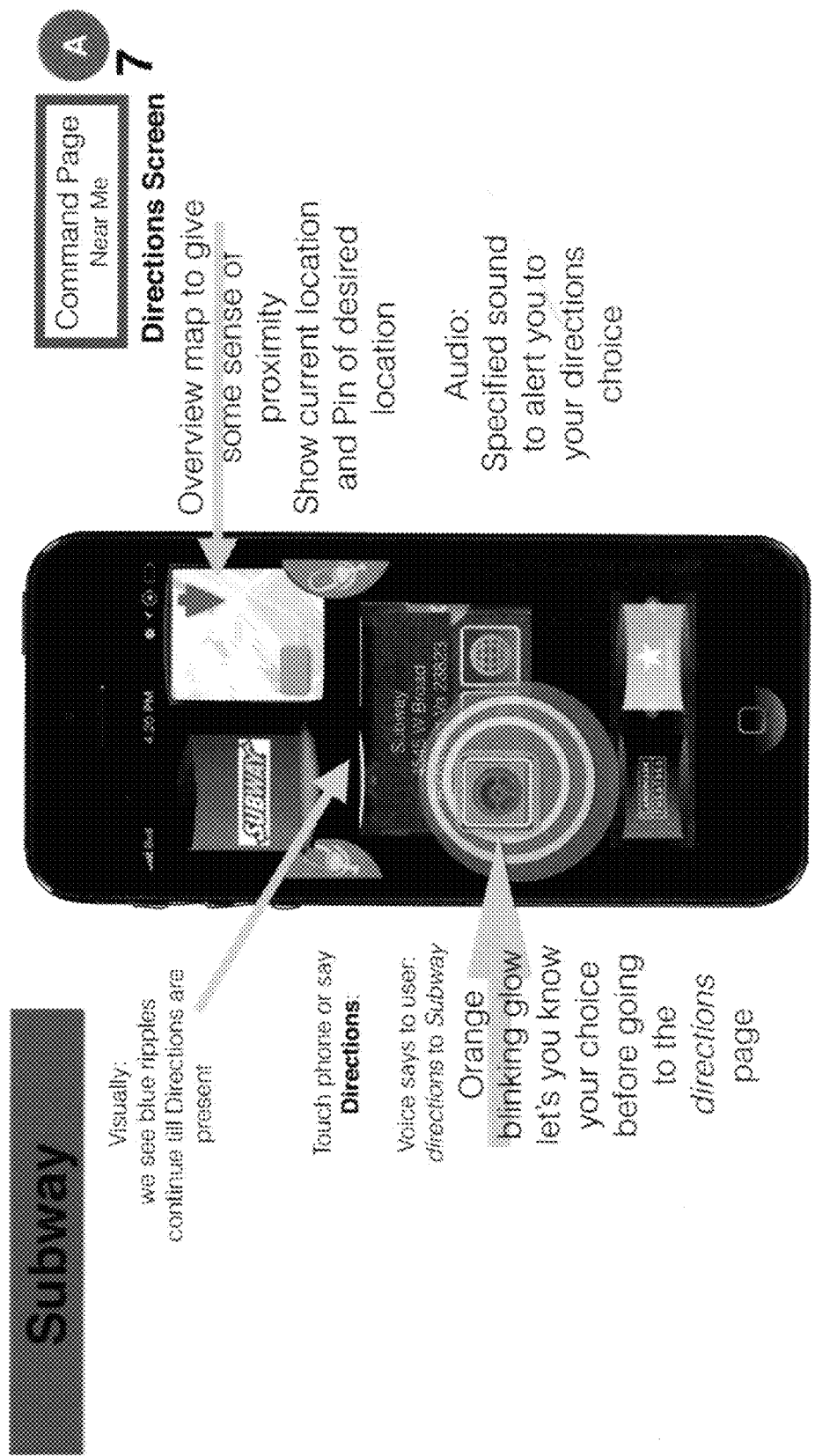

FIG. 18L may represent a Second Searching Screen (6) for the Command Page—Near Me. In this step an overview map 218 may give some sense of proximity and show current location and pin of a desired location. The screen may visually display ripples or circles 214 that may continue until a further option is selected or spoken by the user such as "Directions", "Call" or "Website". FIG. 18L displays how further information is provided, such as an address 232 for each store location. A voice may be played that says "Brand Store—you are 0.5 miles from this location". FIG. 18M may represent a First Directions Screen (7) for the Command Page—Near Me.

FIG. 18M provides for one embodiment where the address can then be requested to be pinned or map and/or driving directions are provided for the selected destination. To ensure that the selection was made correctly, security options can be placed such as shown in FIGS. 18N and 18O where special visual effect, in this case an orange blinking glow 234, can be provided to verify the authenticity of selection. The screen may visually show ripples or circles 214 around the selected object until Directions are present. A user may also touch the phone or say "Directions" and then a voice may be played that says to the user "directions to Branded Store". An audio cue may be used with a specified sound to alert the user to their directions choice. FIG. 18N may represent a Second Directions Screen (8) for the Command Page—Near Me. This screen may be displayed after a user touches the steering wheel 236 image from FIG. 18M for directions. The screen in FIG. 18N may show a turn by turn directions button 238 and a mute button 228. Map and voice directions may be activated in real time. The screen may visually display ripples or circles 214 continue until directions are present. A user may tap on the overview map 218 to go to a full screen view of the map. In some embodiments a voice may be played to the user saying "Let's go". Then audio may be played with directions. In some embodiments a user may ask for turn by turn directions, or use GPS location for navigation.

FIG. 18O may represent a third directions screen (9) for the Command Page—Near Me. A full screen map 230 may be shown, and a voice may be played for the user to hear saying "Full screen" to let the user know their choice. A voice may be played to give turn by turn directions like a standard GPS. FIGS. 18P through T provide for other choices and selection about each category including seeing the map and driving directions and even being redirected to a store or company website.

FIG. 18P may represent a First Call Screen (10) for the Command Page—Near Me. A user may touch the phone or say "call", and then a voice may be played for the user that says "calling to Brand Store". The screen may visually display ripples or circles 214 until calling is present. A voice may be played. In some embodiments an orange blinking glow 234 around a phone button 240 may let the user know their choice before going to the Second Call Screen (11) (FIG. 18Q). In some embodiments the phone number may be displayed. A color glow 242 may indicate distance from the user's current location.

FIG. 81Q may represent a Second call screen (11) for the Command Page—Near Me. A voice may be played and heard by the user that says: "Calling Branded Store". As shown in the example embodiments of FIGS. 18A-U a Favorites Button 244 stays up so another choice can be made.

FIG. 18R may represent a First Website Page (12) for the Command Page—Near Me. A user may touch the Website button 246 or say "Website" and then a voice may be played that says to the user "Website to Branded Store". Ripples or circles 214 may be displayed visually an may continue until the Second Website Screen (13) is present (as shown in FIG. 18S). In some embodiments an orange blinking glow 234 may let the user know their choice before going to the Second Website Screen (13). FIG. 18S may represent a Second Website Screen (13) for the Command Page—Near Me. In this example embodiment the Branded Store website home page 248 may be displayed. Any deals 250 associated with the website 248 may be displayed. A voice may be played for the user that says "Branded Store website". In some embodiments a user may touch the portion of the screen displaying the website graphic to fill the screen or may say "enlarge site".

FIG. 18T may represent a Third Website Screen (14) for the Command Page—Near Me. In this example embodiment a video player 208 may have a play button 252 with an outline 254, and the outline 254 may have a color that varies based on a rating of the video. In some embodiments the video player 208 may appear with a sponsored video commercial after 5 seconds. In some embodiments a user may rotate the device for full screen video, or may hit the play arrow on the video to cancel the Third Website Screen (14) to cancel the Third Website Screen (14) and go to the Video Screen (15) shown in FIG. 18U.

FIG. 18U may represent a Video Screen (15) for the Command Page—Near Me. The Video Screen (15) may be a full screen video player with a play button 252 for one or more videos, and an outline 254 with a color that is based on ratings. The system represented in FIG. 18U may enable the user to make selections by presenting the user with a rating system. For example, picking among one or many hotels in a city, the user can see if a particular selection is rated high by using a certain criteria. In one embodiment, this can be accomplished by the system or previous user selections or by communicating with other default or user selected sites such as Tripadvisor. Those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention. These and other constructions will become obvious to those skilled in the art from the above drawings and detailed description of the preferred embodiments in combination with the claims.

What is claimed is:

1. A computer-implemented method for providing context information on a mobile communication device having a color touch-screen display, a memory, a wireless communication module including radio-frequency circuitry, a global positioning system receiver, said mobile communication device being communicatively connected to a server through the wireless communication module, the method comprising:

Receiving, with the global positioning system receiver, a mobile device location;

Transmitting, with the mobile communication device through the radio-frequency circuitry to the server, a query requesting location specific vendor information;

Receiving, from said server, a result from the query with multiple vendors each having an associated vendor location, and storing said result in said memory;

Comparing, with a processor, the mobile device location with the associated vendor location to determine a distance to each said associated vendor location;

Displaying, on the color touch-screen display, a plurality of dynamic informational icons that each indicate said distance to each said associated vendor location; and Wherein said plurality of dynamic informational icons indicate the distance to each said associated vendor location as a location color, with a first location color indicating said distance to each said associated vendor location is within a first range, and a second location color indicating said distance to each said associated vendor location is within a second range.

2. The method of claim 1, further comprising:

Receiving, from said server in response to said query, an offer data correlated with said associated vendor locations, and storing said offer data in said memory;

Wherein said plurality of dynamic informational icons further indicate said offer data as visually associated with said each said associated vendor location.

3. The method of claim 2 wherein the plurality of dynamic informational icons indicate the offer data as an offer color, with a first offer color indicating a first type of offer, and a second offer color indicating a second offer type.

4. The method of claim 3, wherein the plurality of dynamic informational icons each indicate said location color at a proximal end, and said offer color at a distal end.

5. The method of claim 4 wherein the plurality of dynamic informational icons each display, in a medial portion, a logo associated with said associated vendor location.

6. The method of claim 2 wherein the plurality of dynamic informational icons indicate said offer data with an offer-indicating graphic.

7. The method of claim 6 wherein said offer-indicating graphic incorporates a menu with at least one offer link directed to information stored on a vendor server.

8. The method of claim 6 wherein said offer-indicating graphic includes changing colors or brightness.

9. The method of claim 1 further comprising:

Receiving, with said global positioning system receiver, an updated mobile device location;

Comparing, with said processor, the updated mobile device location with the associated vendor locations to determine an updated distance to each said associated vendor location; and Updating, on the color touch-screen display, said location color of plurality of dynamic informational icons to indicate said updated distance to each said associated vendor location.

10. The method of claim 1 wherein said query includes a user specific preference, and wherein said result from the query is based in part on the user specific preference.

11. The method of claim 10 wherein said user specific preference includes user favorites, and where said result from the query includes user favorite related information.

* * * * *